(12) United States Patent
Starkey et al.

(10) Patent No.: US 6,518,877 B1
(45) Date of Patent: Feb. 11, 2003

(54) PNEUMATIC TIRE MONITOR

(75) Inventors: Gene Raymond Starkey, Niwot, CO (US); Joseph Paul Desimone, II, Ward, CO (US); Dale Lee Yones, Boulder, CO (US); Joseph Michael Letkomiller, Thornton, CO (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/870,569

(22) Filed: May 31, 2001

(51) Int. Cl.$^7$ ............................................... B60C 23/00
(52) U.S. Cl. ...................................................... 340/447
(58) Field of Search ................................ 340/447, 445, 340/446, 442; 73/146.2, 146.8

(56) References Cited

U.S. PATENT DOCUMENTS

| | | | |
|---|---|---|---|
| 3,588,814 A | 6/1971 | Furlong | 340/444 |
| 3,619,678 A | 11/1971 | Ruof | 310/115 |
| 3,665,387 A | 5/1972 | Enabnit | 340/448 |
| 3,831,161 A | 8/1974 | Enabnit | 340/507 |
| 4,052,696 A | 10/1977 | Enabnit | 340/448 |
| 4,067,235 A | 1/1978 | Markland et al. | 73/146.5 |
| 4,220,907 A | 9/1980 | Pappas et al. | 322/3 |
| 4,229,728 A | 10/1980 | Tremba | 340/447 |
| 4,300,120 A | 11/1981 | Surman | 340/447 |
| 4,319,220 A | 3/1982 | Pappas et al. | 340/447 |
| 4,319,354 A | 3/1982 | Manzke et al. | 360/266.5 |
| 4,609,905 A | 9/1986 | Uzzo | 340/447 |
| 4,703,650 A | 11/1987 | Dosjoub et al. | 73/146.5 |
| 4,724,427 A | 2/1988 | Carroll | 340/572.1 |
| 4,742,857 A | 5/1988 | Gandhi | 152/418 |
| 4,842,486 A | 6/1989 | Neubauer | 417/53 |

(List continued on next page.)

FOREIGN PATENT DOCUMENTS

| | | |
|---|---|---|
| BR | PI 9603529-3 | 5/1998 |
| WO | WO99/52722 | 10/1999 |

OTHER PUBLICATIONS

U.S. patent application Ser. No. 09/771,539, Brown, filed Jan. 29, 2001.

*Primary Examiner*—Daryl Pope
(74) *Attorney, Agent, or Firm*—Howard M. Cohn

(57) ABSTRACT

A pneumatic tire monitoring system for monitoring pneumatic tire conditions for one or more tire/wheel assemblies mounted on a vehicle, preferably in combination with a tire pressurizing and regulating apparatus, comprises a transponder with a transmitting antenna mounted on the wheel for transmitting a signal indicating tire condition, one or more receivers with receiving antennas fixedly mounted on the vehicle, and circuitry for processing the received signals; the system characterized in that: circuitry for each transponder is on a printed circuit board within a protective housing coaxial to the hub of the wheel or wheel carrier; and each transmitting antenna is selected from the group comprising a partial loop antenna, a helical antenna, a circular dipole antenna, and a small coupling coil adjacent to an endless hoop antenna. The partial loop antenna is mounted in each housing affixed around a portion of the circumference of the printed circuit board, having an angular arc length, and comprises a serpentine portion for increasing the effective length of the partial loop antenna without also extending the angular arc length. The angular arc length and the affixed placement are determined for avoiding RF signal interference due to interaction with signal-interfering objects in the housing. Additionally, the partial loop antenna has an end portion that can be trimmed for adjusting the effective length to enable tuning of the antenna for optimum transmission at different radio transmission frequencies.

20 Claims, 13 Drawing Sheets

U.S. PATENT DOCUMENTS

| | | | |
|---|---|---|---|
| 4,911,217 A | 3/1990 | Dunn et al. | 152/152.1 |
| 5,181,975 A | 1/1993 | Pollack et al. | 152/152.1 |
| 5,218,861 A | 6/1993 | Brown et al. | 73/146.5 |
| 5,218,862 A | 6/1993 | Hurrell, II et al. | 73/146.5 |
| 5,315,866 A | 5/1994 | Righi | 73/146.5 |
| 5,339,073 A | 8/1994 | Dodd et al. | 340/5.61 |
| 5,345,217 A | 9/1994 | Prottey | 340/442 |
| 5,413,159 A | 5/1995 | Olney et al. | 152/418 |
| 5,505,080 A | 4/1996 | McGhee | 73/146.5 |
| 5,524,034 A | 6/1996 | Srygley et al. | 377/15 |
| 5,569,848 A | 10/1996 | Sharp | 73/146.2 |
| 5,612,671 A | 3/1997 | Mendez et al. | 340/447 |
| 5,667,606 A | 9/1997 | Renier | 152/421 |
| 5,749,984 A | 5/1998 | Frey et al. | 152/415 |
| 5,824,891 A | 10/1998 | Monson | 73/146.5 |
| 5,969,239 A | 10/1999 | Tromeur et al. | 73/146.5 |
| 6,292,096 B1 * | 9/2001 | Munch et al. | 340/445 |

\* cited by examiner

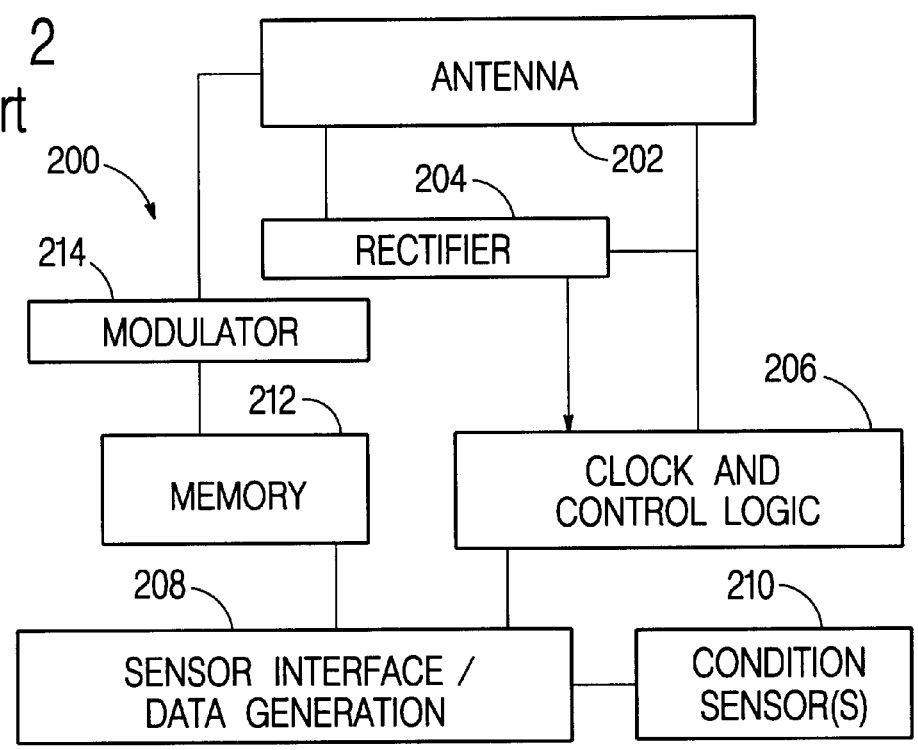

PNEUMATIC TIRE MONITOR

CROSS-REFERENCE TO RELATED APPLICATIONS

This application is related to U.S. application Ser. No. 09/771,539 entitled MONITORING PNEUMATIC TIRE CONDITIONS having a filing date of Jan. 29, 2001.

TECHNICAL FIELD OF THE INVENTION

The present invention relates to a system for and a method of monitoring at least one dynamic condition of a pneumatic tire, such as pressure.

BACKGROUND OF THE INVENTION

The present invention relates to monitoring of conditions of a pneumatic tire, most importantly pneumatic pressure, and optionally temperature and/or tire revolution counting. Pressure (pneumatic pressure) is well known as a critical factor in pneumatic tire operation, most importantly if there is a loss of sufficient pressure to safely operate the tire, e.g., a "flat tire". The (pneumatic) temperature is generally of secondary importance. Although it can be used to indicate an average temperature of the tire and wheel surrounding the pneumatic cavity, temperature is mostly used to normalize a pressure measured in a hot tire to a "cold pressure" value, i.e., the pressure as it would be in a "cold" tire. When a pump system is included in order to regulate the air pressure in a tire, a pressure monitor can provide feedback to a vehicle operator about the status of the pressure regulation, which may very well be unable to regulate pressure under extreme conditions such as, for example, a large puncture or a blow-out of the tire. Revolution counting is often desired as an indication of tire usage. In general terms, as tire usage increases so does the risk of tire problem occurrence.

A great deal of prior art is devoted to apparatus and methods for measuring and monitoring rotary element and pneumatic conditions, particularly as they relate to pneumatic tire conditions.

THE ASSIGNEES ONGOING DEVELOPMENT EFFORTS

For a century, the Goodyear Tire & Rubber Company of Akron Ohio, assignee of the present invention, has been the uncontested industry leader in tire product technology. For example, as early as 1892, a puncture-resistant tire was patented. In 1934, a year recognized as the beginning of the run-flat era, Goodyear introduced the Lifeguard (tm) safety tube, a fabric tube within the tire, used commercially by automakers and on trucks. In 1993, Goodyear's Eagle GS-C EMT (Extended Mobility Technology) Tire won the Discover Award for Automotive Technological Innovation. In 1996, the Goodyear Eagle F1 run-flat tire was chosen as standard equipment on the 1997 Chevrolet C-5 Corvette.

Other examples of the strides Goodyear has taken in the advancement of tire and related technologies include, but are not limited to, the following patented inventions: Commonly-owned U.S. Pat. No. 3,665,387 (Enabnit; 1972), entitled SIGNALLING SYSTEM FOR LOW TIRE CONDITION ON A VEHICLE, incorporated in its entirety by reference herein, discloses a low tire pressure warning system adaptable for any number of wheels of a vehicle and providing dashboard indications of system operation and low pressure conditions while the vehicle is in motion.

Commonly-owned U.S. Pat. No. 3,831,161 (Enabnit; 1974), entitled FAIL-SAFE MONITORING APPARATUS, incorporated in its entirety by reference herein, discloses monitoring vehicle tire pressure wherein the operator is warned of an abnormal or unsafe condition of one or more of the tires.

Commonly-owned U.S. Pat. No. 4,052,696 (Enabnit; 1977), entitled TIRE CONDITION MONITOR, incorporated in its entirety by reference herein, discloses a tire condition sensing circuit that includes a ferrite element that changes from a ferromagnetic to a non-ferromagnetic state in response to a temperature increase above the material Curie point.

Commonly-owned U.S. Pat. No. 4,911,217 (Dunn, et. al.; 1990), entitled INTEGRATED CIRCUIT TRANSPONDER IN A PNEUMATIC TIRE FOR TIRE IDENTIFICATION, incorporated in its entirety by reference herein, discloses an RF transponder in a pneumatic tire. FIG. 1a of this patent illustrates a prior-art identification system ("reader") that can be used to interrogate and power the transponder within the tire. The identification system includes a portable hand-held module having within it an exciter and associated circuitry for indicating to a user the numerical identification of the tire/transponder in response to an interrogation signal.

Commonly-owned U.S. Pat. No. 5,181,975 (Pollack, et. al.; 1993), entitled INTEGRATED CIRCUIT TRANSPONDER WITH COIL ANTENNA IN A PNEUMATIC TIRE FOR USE IN TIRE IDENTIFICATION, incorporated in its entirety by reference herein, discloses a pneumatic tire having an integrated circuit (IC) transponder and pressure transducer. As described in this patent, in a tire that has already been manufactured, the transponder may be attached to an inner surface of the tire by means of a tire patch or other similar material or device.

Commonly-owned U.S. Pat. No. 5,218,861 (Brown, et al.; 1993), entitled PNEUMATIC TIRE HAVING AN INTEGRATED CIRCUIT TRANSPONDER AND PRESSURE TRANSDUCER, incorporated in its entirety by reference herein, discloses a pneumatic tire having an integrated circuit (IC) transponder and pressure transducer mounted within the pneumatic tire. Upon interrogation (polling) by an external RF signal provided by a "reader", the transponder transmits tire identification and tire pressure data in digitally-coded form. The transponder is "passive" in that it is not self-powered, but rather obtains its operating power from the externally-provided RF signal.

The commonly-owned U.S. Patents referenced immediately hereinabove are indicative of the long-standing, far-reaching and ongoing efforts being made by the Goodyear Tire & Rubber Company in advancing tire product technology, particularly in the area of monitoring tire operating conditions.

DYNAMIC CONDITIONS

Dynamic conditions such as revolution counting are readily determined. Straightforward tire revolution counters are well known, and are disclosed for example in U.S. Pat. Nos. 4,842,486 and 5,524,034, both of which are incorporated in their entirety by reference herein.

U.S. Pat. No. 5,218,862, incorporated in its entirety by reference herein, discloses a tire pressure monitor comprising wheel speed sensors located at the vehicle's wheels to convey wheel speed information to an electronic controller. This patent notes that the wheel speed discrepancy between one tire to the others indicates the relative tire pressure, but that discrepancy may also be indicative of the vehicle turning, accelerating or decelerating, going up or down steep grades, or of one wheel slipping, or of a cross wind bearing on the vehicle.

U.S. Pat. No. 5,345,217, incorporated in its entirety by reference herein, discloses measuring wheel speed of a motor vehicle with a multi-tooth pulse generator on each wheel (as is used on electronic Anti-Lock Braking Systems) to produce a series of pulses spaced apart by equal increments of angular rotation of each wheel. The speed of each wheel is compared to the others, to determine if, and to what extent, a tire is deflated. U.S. Pat. No. 5,569,848, incorporated in its entirety by reference herein, discloses a system for monitoring tire pressure, comprising toothed ring sensors affixed to each wheel assembly, a sensor operatively associated with each respective toothed ring and producing signals that are a measure of the rotational velocity of the wheels, and a computer receiving signals from the sensors. The computer monitors the wheel speed sensors during vehicle operation, calculating and indicating vehicle speed, distance traveled by the vehicle and low tire pressure.

U.S. Pat. No. 3,588,814, incorporated in its entirety by reference herein, discloses an electric tire inflation indicator which determines the inflated condition of a tire by monitoring the rotational travel speed of the tire's respective wheel, by means of a stationary reed switch and a magnet rotating with the wheel.

U.S. Pat. No. 5,749,984, incorporated in its entirety by reference herein, discloses a tire monitoring system and method utilizing a sensor in the tire to detect tire sidewall deflection and thereby determine tire pressure, tire speed and the number of tire revolutions.

STATIC CONDITIONS

In addition to the aforementioned dynamic conditions, static conditions are also associated with rotating elements such as pneumatic tires—for example, pressure and temperature. Failure to correct quickly for improper tire pressure may result in excessive tire wear, blowouts, poor gasoline mileage and steering difficulties. An automatic tire deflation warning system is especially critical for "run flat" tires, where the deflated condition is barely detectable by the driver himself. Sensors for static parameters are typically located within the rotating tire, and associated circuitry can transmit data indicative of a sensed condition to an on-board receiver within the vehicle.

TRANSPONDER SYSTEMS FOR PNEUMATIC TIRES

A "transponder" is an electronic device capable of both receiving and transmitting radio frequency (RF) signals. Transponder systems, typically including a plurality of transponders and a single interrogator are well known and disclosed, for example, in U.S. Pat. No. 5,339,073, incorporated in its entirety by reference herein.

It is known to put transponders (and associated sensors) in pneumatic tires of motor vehicles. These transponders transmit a RF wave, with or without variable data (e.g., tire pressure, temperature, position) and/or fixed data (e.g., tire ID) to outside the tire, and receive RF signals, with or without data, from outside the tire. A separate transponder is typically associated with each tire of a motor vehicle to monitor and transmit tire-related data. Typically, an "interrogator" having both transmitting and receiving capabilities is used to communicate with the transponders. The interrogator may be "hand-held", or mounted "on-board" the vehicle, or positioned along or in a roadway (e.g., "drive-over", or "drive by").

"Active" transponders have their own power supply (e.g., a battery). They transmit signals, and are typically also capable of receiving signals to control their functionality. "Passive" transponders are powered by the energy of an incoming RF signal, such as from an interrogator. Passive transponders fall into two general categories, those having only passive circuitry, and those having some active circuitry.

U.S. Pat. No. 5,612,671, incorporated in its entirety by reference herein, discloses a low tire pressure warning system having a pressure sensor and radio transmitter in each wheel, and a vehicle-mounted receiver including a microprocessor.

U.S. Pat. No. 4,609,905, incorporated in its entirety by reference herein, discloses a passive transponder having only passive circuitry. An RF transmitter in the vehicle interrogates the transponder, which reflects a predetermined harmonic of the RF signal back to a receiver as a function of the state of an associated pressure switch.

U.S. Pat. No. 4,067,235, incorporated in its entirety by reference herein, discloses a passive transponder with a tire pressure sensor. Electromagnetic radiation generated by a power transmitter is received by a receiving antenna comprising an inductor and a capacitor in the tire pressure sensor. This radiation is converted by a rectifier-filter to electricity to power active components (oscillator, buffer amplifier, transmitter) of the transponder.

U.S. Pat. No. 4,724,427, incorporated in its entirety by reference herein, discloses a passive transponder that receives a carrier signal from an interrogator. The carrier signal is rectified by a rectifying circuit connected across the transponder's antenna coil to generate electricity to power the transponder. Data is encoded and mixed with the carrier signal in a balanced modulator circuit. The output of the balanced modulator circuit is transmitted back to the interrogator unit.

U.S. Pat. No. 4,703,650, incorporated in its entirety by reference herein, discloses a circuit suitable for one of many methods of coding for transmission the values of variables measured in a tire, and a device for monitoring tires employing such a circuit. An astable multivibrator transforms the measurement of the variable in question, for instance pressure and temperature, into a time measurement. The astable multivibrator delivers a pulse signal whose pulse width is a function of the temperature and the cyclic ratio of which is a function of the pressure. The signal is suitably transmitted from the tire to the vehicle by, for example, inductive coupling.

U.S. Pat. No. 4,730,188, incorporated in its entirety by reference herein, discloses a passive transponder excited by an inductive coupling from an interrogator. The transponder responds to the interrogator via the inductive coupling with a signal constituting a stream of data. The transponder comprises an induction coil serving as its antenna, and a full wave rectifier bridge and smoothing capacitor connected across the antenna to provide DC voltage (power) to active circuitry within the transponder.

U.S. Pat. No. 5,969,239, incorporated in its entirety by reference herein, discloses some forms of antennas for electromagnetically coupling moving transponders in tires to stationary antennas on the vehicle. The patent concerns replacing an annular coil type of rotating antenna with a smaller antenna integrated with the measurement sensor (transponder) in one small box firmly attached to the wheel, plus a closed circular strip-iron coupling ring attached to and coaxial with the wheel. The rotating antenna, stationary antenna and coupling ring are positioned so that electric current is induced in the coupling ring by magnetic flow in either of the antennas and vice versa. Alternate embodiments are mentioned which consider using the "metallic environment" in place of the ring of strip iron, for example the wheel itself, or at least one of the metallic beads of the tire. The frequency of transmission is from 30 to 100 kilohertz.

U.S. Pat. No. 5,824,891, incorporated in its entirety by reference herein, discloses "a transmitting circuit . . . mounted on a frame member. The transmitting circuit includes a transmitting coil and generates electrical energy. . . . " A "receiving is inductively coupled to the transmitting circuit. The receiving circuit includes a sensor for generating a data corresponding to a physical characteristic of the vehicle wheel and a wireless communication circuit for receiving the electrical energy from the transmitting coil to remotely power the receiving circuit and for transferring the data signal from the receiving circuit to the transmitting circuit".

U.S. Pat. No. 4,911,217, incorporated in its entirety by reference herein, discloses an RF transponder in a pneumatic tire. FIG. 1a illustrates a prior-art identification system ("reader") that can be used to interrogate and power the transponder within the tire. A portable hand-held module has within it an exciter and circuitry for indicating the numerical identification of the tire/transponder.

U.S. Pat. Nos. 5,181,975 and 5,218,861, incorporated in their entirety by reference herein, disclose a pneumatic tire having an integrated circuit passive transponder located within the structure of the tire for use in tire identification and pressure data transmission. The interrogation signal is rectified by circuitry in the transponder, which then utilizes the rectified signal as its source of electrical power for use in its transmission of digitally encoded signals.

U.S. Pat. No. 4,220,907, incorporated in its entirety by reference herein, discloses a low tire pressure alarm system for vehicles. Each wheel is provided with a transmitter, and there is a common receiver comprising a suitable antenna such as a ferrite loopstick.

U.S. Pat. No. 4,319,220, incorporated in its entirety by reference herein, discloses a system for monitoring tire pressure, comprising wheel units in the tires and a common receiver. Each wheel unit has an antenna comprising a continuous wire loop disposed against the inner periphery of the tire for transmitting signals and for receiving power. Multiple antennas may be provided for the receiver, and may be in the form of ferrite loopsticks.

U.S. Pat. No. 5,319,354, incorporated in its entirety by reference herein, discloses an antenna structure for communicating with an electronic tag (transponder) implanted in a pneumatic tire. This patent recognizes that the orientation of the transponder with respect to the antenna communicating with the transponder can adversely affect coupling between the interrogation antenna and the transponder antenna. A construction of an interrogation antenna is described so that, regardless of the position of the transponder in the pneumatic tire, a position of which is unknown, the coupling is always of the same quality.

International Publication No. WO 99/52722 (Oct. 21, 1999), incorporated in its entirety by reference herein, discloses a method and apparatus for sensing tire pressure in a vehicle wheel which is wireless. It employs "known" pressure and temperature sensors, "known" revolution detectors (e.g., ABS), and "known" controllers. A transducer, the sensors, a power source (e.g., battery), and a transmitter are mounted on the wheel rim, interior to the tire. The transducer measures a pneumatic pressure and/or temperature and/or wheel speed that is converted into a wireless data signal by the transmitter. A receiver coil [antenna] is connected to a portion of the vehicle, such as a wheel well member, preferably within three tenths of a meter of the transducer/transmitter coil. Another coil connected to the vehicle may be tuned to receive wheel speed signals from the "known type" of wheel speed sensor, and these signals are conditioned by the receiver and passed to the controller along with the pressure and temperature signal. The pressure/temperature signal and the wheel speed signal may be distinguished by various known means such as by frequency or modulation design, or a separate receiver can be utilized.

Some of the prior art mounts the tire monitoring and transmitting electronics package on the wheel hub and coaxial to the axis of rotation, often in combination with a device for using the wheel rotation to generate power and/or count revolutions. Examples of this construction are found in U.S. Pat. Nos. 4,229,728; 4,300,120; and 5,315,866 which are described as follows.

U.S. Pat. Nos. 4,229,728 and 4,300,120, incorporated in their entirety by reference herein, both disclose a tire pressure monitor having a self-contained generator-transmitter unit affixed to each wheel comprising a pendulum magnet, and a rotating inductor attached to a circuit board (48) containing the discrete electrical components of the wheel mounted unit. It can be seen that the circuit board is affixed to the wheel around a pin (38) at the center of the wheel's axis of rotation. The transmitter on the circuit board has an antenna (22), but no details are provided about the antenna's placement or construction.

U.S. Pat. No. 5,315,866, incorporated in its entirety by reference herein, discloses an indicating device, especially for indicating the state of pressure of a tire, of the type that can be fixed to a wheel in an exactly coaxial position. The device is contained in an openable cylindrical box (6) provided with holes in external box extensions for fixing it to the wheel. The device contained in the box (6) includes: a pressure measuring device (7) is connected by a tube (4) to the tire inflation valve; a transducer/transmitter (8) of which only the printed circuit [board] is shown (seen in FIG. 3 as parallel to the box and wheel, coaxial to the axis of rotation); a rotor (12) attached to the box; and a stator (13) prevented from rotating by a counterweight (14) and a weight (15). The circuit board (8) is shown as coaxial around the central rotor and stator, but the counterweight and weight extend radially out over most of the board (8). No details are given concerning the circuitry of the transducer/transmitter or pressure measuring device, and a transmitting antenna is not mentioned at all.

TIRE PRESSURE REGULATION

In addition to sensing, if not measuring/monitoring, pneumatic tire pressure, a variety of systems have been developed to regulate, adjust and/or replenish the pneumatic medium (air) in a tire.

U.S. Pat. No. 5,505,080, incorporated in its entirety by reference herein, discloses a tire pressure management system including a tire condition monitor connected to the tire so as to be interactive with air pressure in the tire for selectively measuring a pressure in the tire, a controller, and a display. The tire condition monitor includes a transmitter and a receiver. The controller also has a transmitter and a receiver connected thereto, and the condition monitor and controller communicate via radio signals. An air compressor is mounted to a wheel of the tire so as to deliver air to an interior of the tire when the pressure of the tire is below a predetermined value. A power generator is connected to the wheel of the tire and includes an alternator magnet assembly and an induction coil assembly which are connected to the wheel of the tire such that relative rotation occurs therebetween as the tire rotates. FIG. 7 illustrates a tire pressure sensor, a temperature sensor, and a pick-up coil for revolution counting, all connected to the microprocessor chip of the condition monitor. The revolution counter is said to be usable "in place of [a] hubometer."

U.S. Pat. No. 5,667,606, (referred to hereinbelow as the "Renier/Cycloid '606 Patent") incorporated in its entirety by reference herein, discloses a tire pressurizing and regulating apparatus comprising a displacement type air pump axially mounted on a vehicle wheel with an air pressure connection conduit introducing air under pressure generated from the pump into the pneumatic tire. A conventional [mechanical] pressure level mechanism is also provided and connected to the pump for establishing and maintaining a desired air pressure in the tire at a predetermined level. A cam and cam follower arrangement is mounted in the housing for the pump, and a pendulum is mounted for free axial rotation relative to the pump housing. The pendulum is connected to one of the cam or cam follower, and the other is secured to the pump housing for rotation therewith to provide a cam actuated driving movement for the pump.

U.S. Pat. No. 4,742,857, incorporated in its entirety by reference herein, discloses a tire pressure sensor and air supply to maintain desired tire pressure. The disclosed system for detecting the air pressure in each wheel (by means of a moveable magnet pressure sensor) and for effecting inflation or deflation in each wheel (by means of a valve connected to the moveable magnet) while the vehicle is operating, includes a controller and a high pressure reservoir mounted on each wheel. A data processor displays the tire pressure to the vehicle operator and allows for manual actuation of the valve for raising or lowering of the tire pressure.

U.S. Pat. No. 5,413,159, incorporated in its entirety by reference herein, discloses a self regulating tire pressure system and method which employs a bistable valve that allows air from a high pressure reservoir (mounted on the wheel) to replenish the pressure within a tire when it has fallen below an actuating pressure, and discontinues its operation only after the tire pressure has increased to a closing pressure that is greater than the actuating pressure. The system is capable of sensing the frequency, number and duration of the valve's operations as indications of a slow tire leak, a flat, or a low reservoir pressure condition, respectively.

In a variation that does not require an air pressure supply mounted on the tire, Brazilian Patent No. PI 9603529-3A, incorporated in its entirety by reference herein, discloses a system with one or more minicompressors with pressure sensors mounted in the vehicle and coupled to the tires by means of rotating air couplings.

BRIEF SUMMARY OF THE INVENTION

According to an aspect of the invention, a system for monitoring pneumatic tire conditions for one or more tire/wheel assemblies mounted on a vehicle; each tire/wheel assembly comprising a tire mounted on a wheel or wheel carrier; and the system comprising: a transponder with a transmitting antenna mounted on the wheel or wheel carrier of the one or more tire/wheel assemblies for transmitting a signal indicating the condition of the tire of the one or more tire/wheel assemblies, one or more receivers each having one or more receiving antennas fixedly mounted on the vehicle, and circuitry for processing the signals received by the one or more receiving antennas to determine the condition of the tire of the one or more tire/wheel assemblies; the system is characterized in that: circuitry for each transponder is on a printed circuit board within a protective housing coaxial to the hub of the wheel or wheel carrier; and each transmitting antenna is selected from the group comprising a partial loop antenna, a helical antenna, a circular dipole antenna, and a small coupling coil adjacent to an endless hoop antenna.

According to the invention, when the partial loop antenna is selected as the transmitting antenna; the partial loop antenna is affixed on a surface of the printed circuit board around a portion of the circumference of the printed circuit board, and has an angular arc length; and the partial loop antenna comprises a serpentine portion for increasing the effective length of the partial loop antenna without also extending the angular arc length. Optionally, the transponder comprises one or more RF transmission-interfering objects; and the angular arc length and the affixed placement of the partial loop antenna are determined for avoiding interference. Optionally, the partial loop antenna comprises an end portion adjacent to a trimming scale imprinted on the printed circuit board, for indicating locations for trimming the end portion as a guide to proper antenna trimming. Optionally, the partial loop antenna end portion is trimmed to enable tuning of the antenna for optimum transmission at different radio transmission frequencies.

According to the invention, the system comprises a pump system mounted on the wheel or wheel carrier of the one or more tire/wheel assemblies for tire pressure regulation; and a tire pressure sensor connected to the wheel or wheel carrier transponder for measuring the tire pressure.

According to the invention, the transmitted signal comprises a message packet short enough to transmit within less than one revolution period of the wheel or wheel carrier when the vehicle is moving at its fastest expected speed. Preferably, the message packet begins with a 10 bit sync pattern which is not further encoded; and the remainder of the message packet comprises data bits ending with an 8 bit CRC which is encoded, wherein the remainder is encoded by a 4B/5B coding scheme using straight NRZI for bit determination.

According to another aspect of the invention, a system for monitoring automatic tire pressure maintenance for one or more tires of a vehicle, wherein a pump system in a housing attached to each of one or more wheels or wheel carriers of the vehicle is utilized to automatically maintain a setpoint pressure in a pneumatic tire mounted on the wheel or wheel carrier, the system is characterized by: a transponder mounted in the housing with the pump system, wherein circuitry for the transponder is on a printed circuit board within the housing and coaxial to the hub of the wheel or wheel carrier; a transmitting antenna associated with the transponder; a receiver mounted on the vehicle; a receiving antenna associated with the receiver; a tire pressure sensor connected to the transponder; and a control circuit associated with the transponder for measuring the tire pressure using the tire pressure sensor, for converting the tire pressure measurement to an RF signal, and for transmitting the RF signal to the receiving antenna and receiver using the transmitting antenna.

According to the invention, the transmitting antenna is selected from the group comprising a partial loop antenna, a helical antenna, a circular dipole antenna, and a small coupling coil adjacent to an endless hoop antenna. Preferably, the partial loop antenna is selected as the transmitting antenna; the partial loop antenna is affixed on a surface of the printed circuit board around a portion of the circumference of the printed circuit board, and has an angular arc length; and the partial loop antenna comprises a serpentine portion for increasing the effective length of the partial loop antenna without also extending the angular arc length. Furthermore, the system comprises one or more RF transmission-interfering objects contained in the housing; and the angular arc length and the affixed placement of the partial loop antenna are determined for avoiding interference. Optionally, the transmitted signal comprises a message packet short enough to transmit within less than one revolution period of the wheel or wheel carrier when the vehicle is moving at its fastest expected speed. Preferably, the message packet begins with a 10 bit sync pattern which is not further encoded; and the remainder of the message packet comprises data bits ending with an 8 bit CRC which is encoded, wherein the remainder is encoded by a 4B/5B coding scheme using straight NRZI for bit determination.

According to the invention, the pump system comprises a pendulum; the transponder circuitry comprises one or more coils for interacting with the pendulum to determine a revolution angular position or a revolution count; and the control circuit includes the revolution count in the transmitted RF signal.

According to the invention, a temperature sensor is connected to the transponder for measuring temperature; and the control circuit includes the temperature measurement in the transmitted RF signal.

According to the invention, the receiver is a single unit; and a display is associated with the receiver for informing a vehicle operator about tire pressure maintenance for each of the one or more tires. Preferably, the receiving antenna is a single antenna; and the control circuit associated with the transponder on each of the one or more wheels or wheel carriers of the vehicle includes a unique transponder identifying code in the transponder's RF signal.

According to an aspect of the invention, a pneumatic tire condition monitor in combination with a tire pressurizing and regulating apparatus for one or more tires of a vehicle, wherein the apparatus is in a housing attached to each of one or more wheels or wheel carriers of the vehicle, the monitor is characterized by: a partial loop antenna mounted in each housing with the apparatus, affixed on a printed circuit board which is coaxial to the hub of the wheel or wheel carrier; the partial loop antenna is affixed around a portion of the circumference of the printed circuit board, having an angular arc length; the partial loop antenna comprises a serpentine portion for increasing the effective length of the partial loop antenna without also extending the angular arc length; and the angular arc length and the affixed placement of the partial loop antenna are determined for avoiding RF signal interference due to interaction with signal-interfering objects in the housing. Optionally, the partial loop antenna has an end portion which is trimmed for adjusting the effective length to enable tuning of the antenna for optimum transmission at different radio transmission frequencies.

Other objects, aspects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
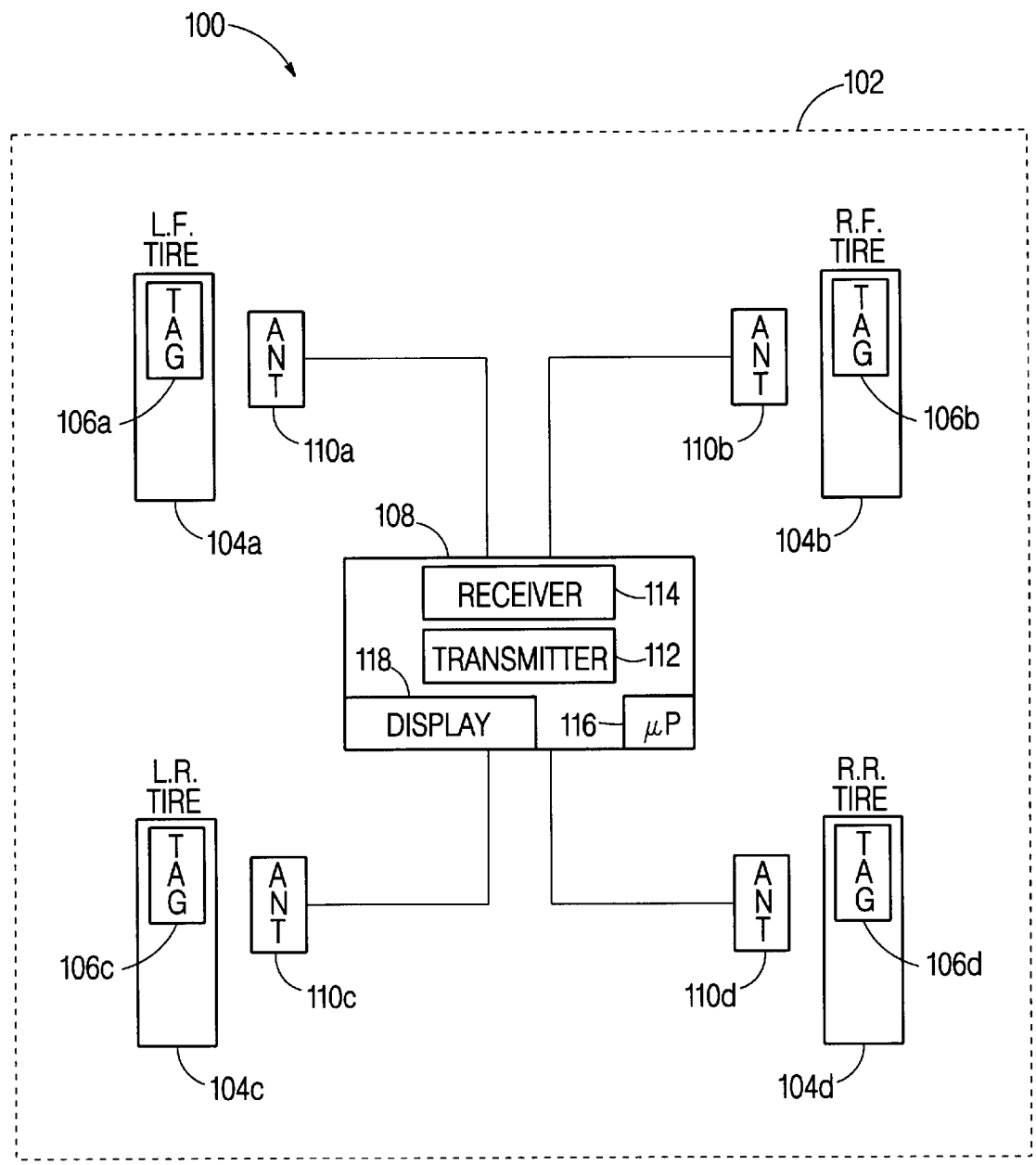

Elements of the figures are typically numbered as follows. The most significant digit (hundreds) of the reference number usually corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in another figure. In some cases, similar (including identical) elements may be referred to with similar numbers in a single drawing. For example, each of a plurality of elements 199 may be referred to individually as 199a, 199b, 199c, 199d, or the plurality may be referred to collectively as 199, or as 199a–199d. Such relationships, if any, between similar elements in the same or different figures will become apparent throughout the specification, including, if applicable, in the claims and abstract.

Figure 1A:
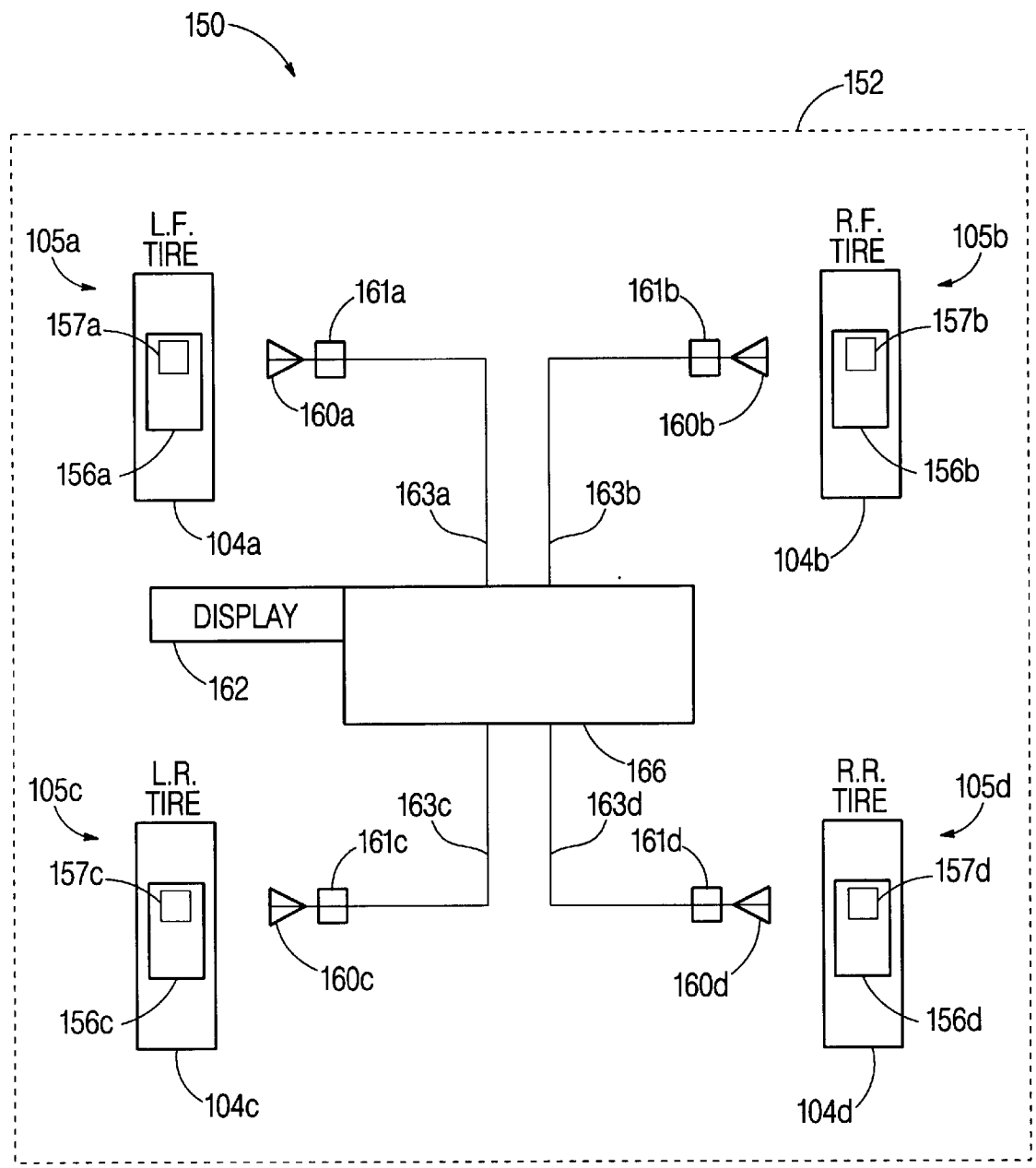
Figure 1B:
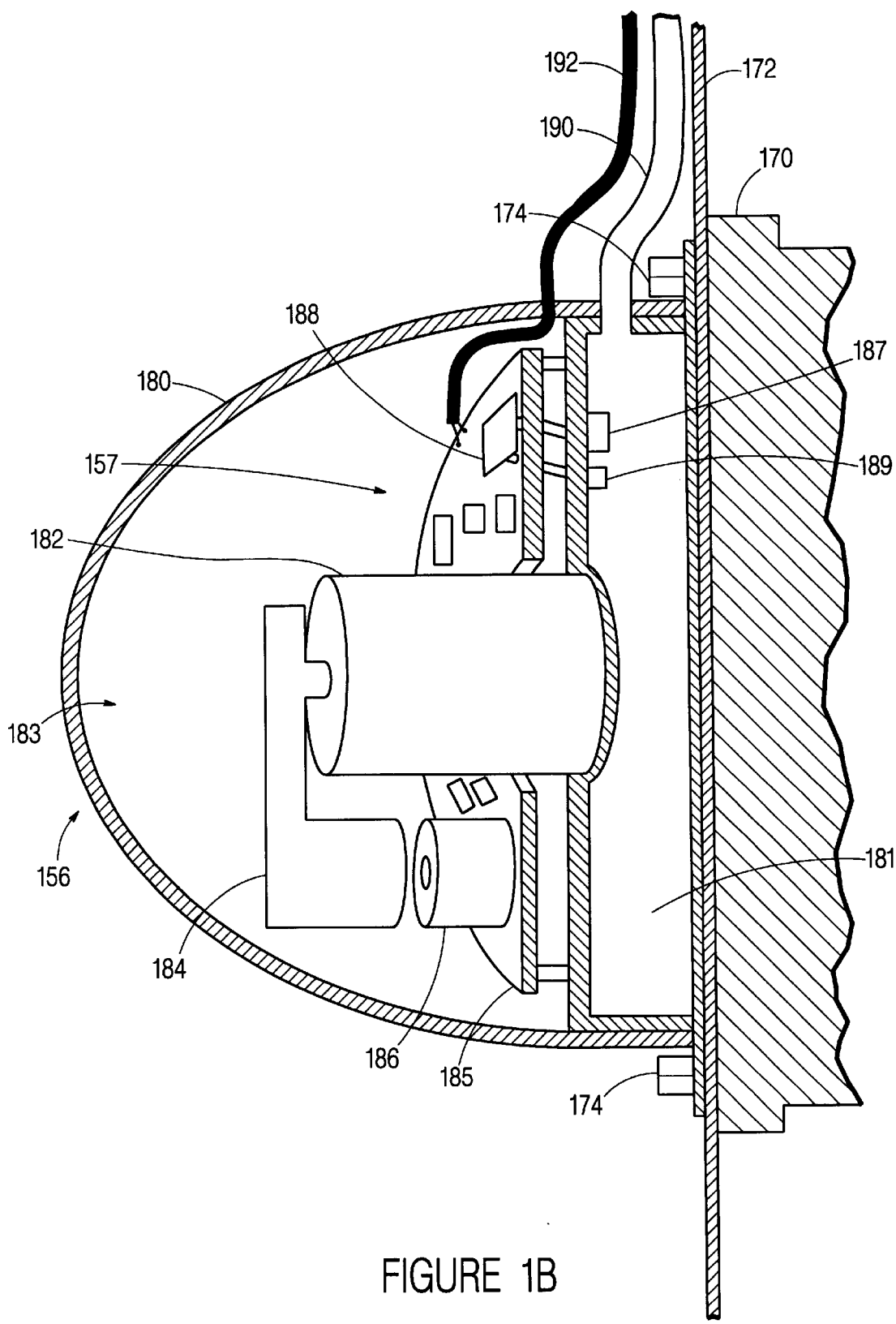
Figure 1C:
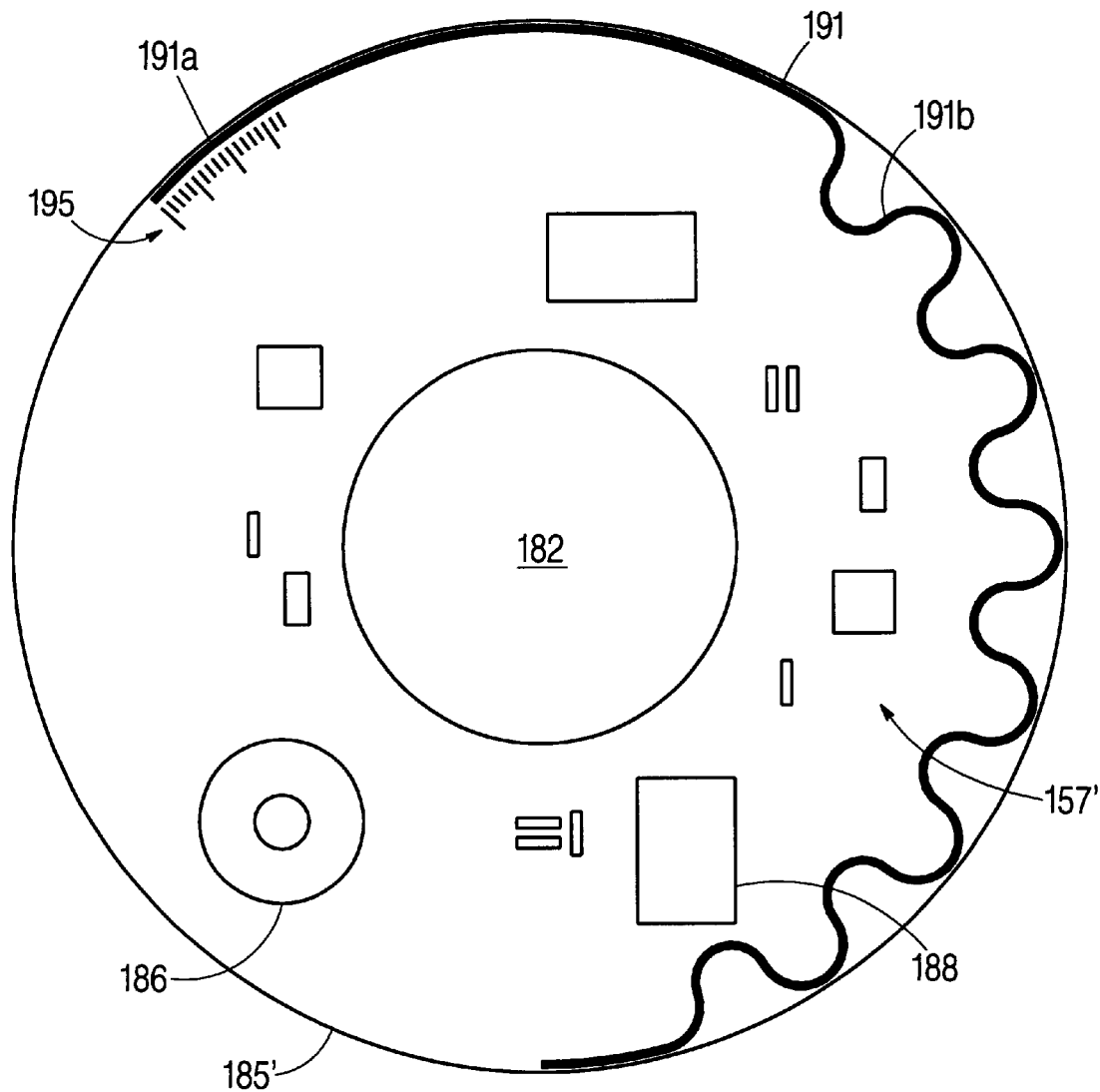
Figures 1D, 1E:
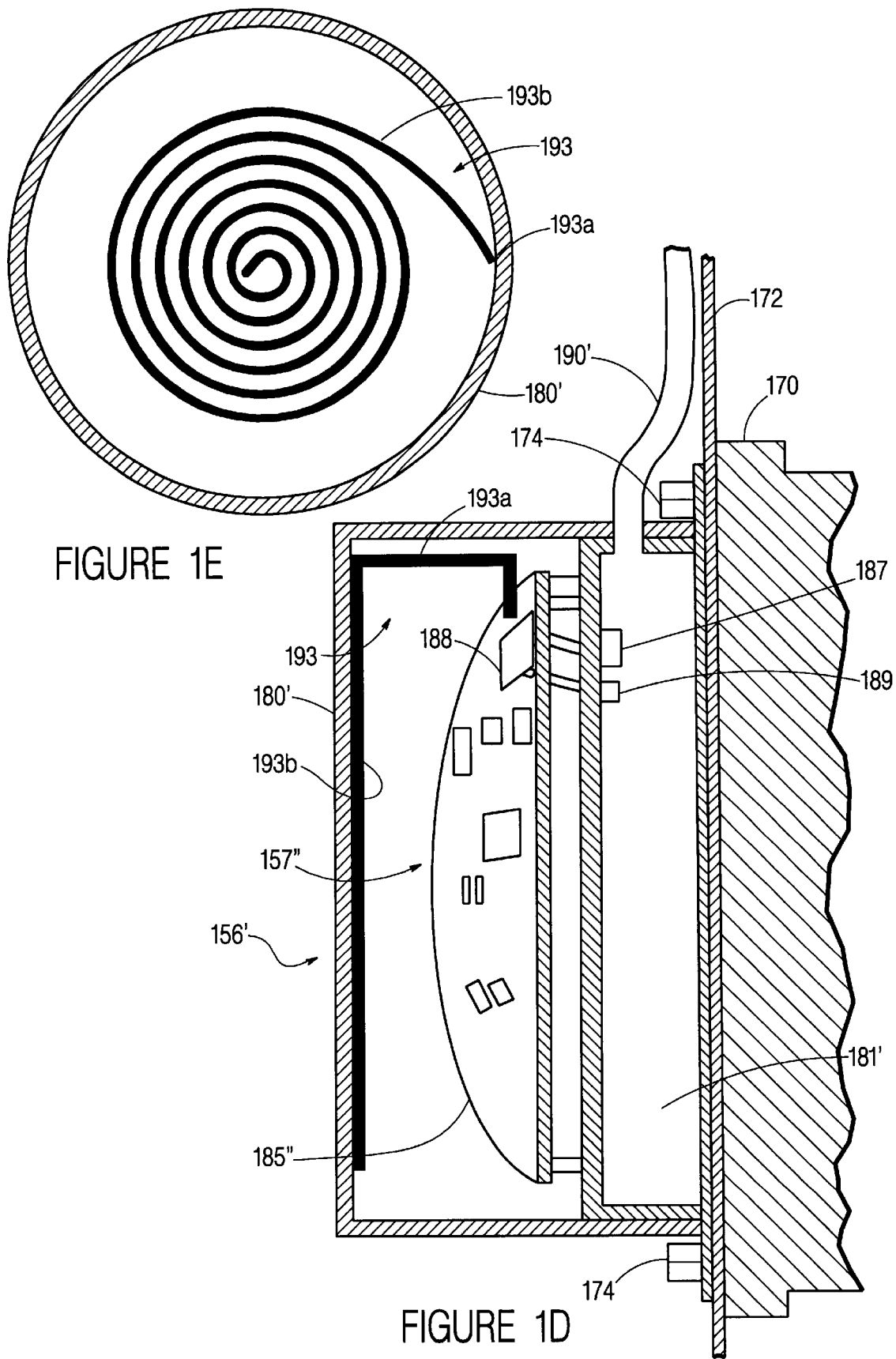
Figure 3A:
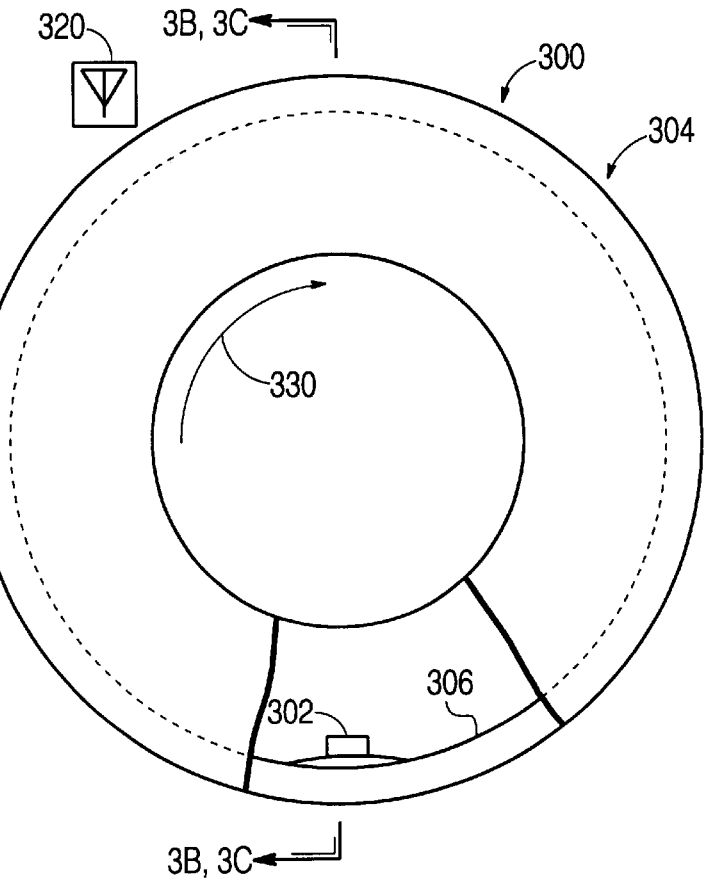
Figure 3B:
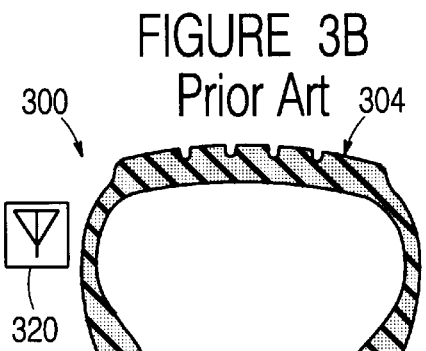
Figure 3C:
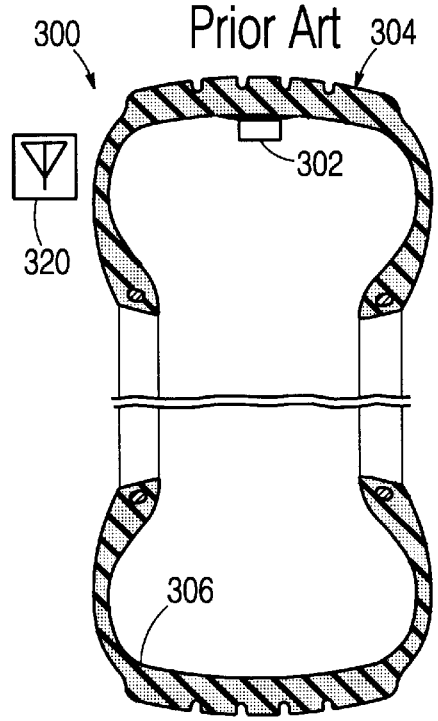
Figure 4:
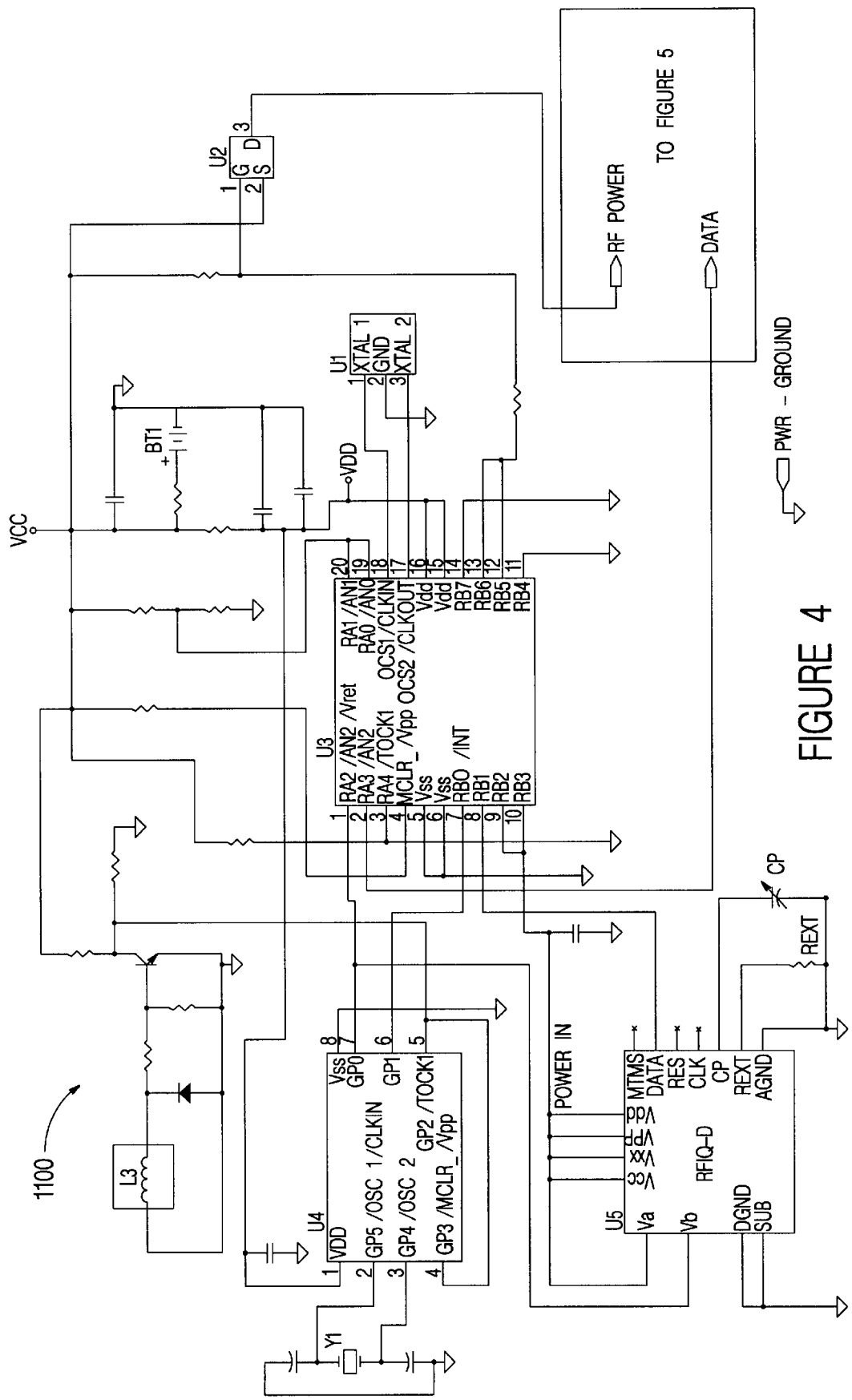
Figure 4A:
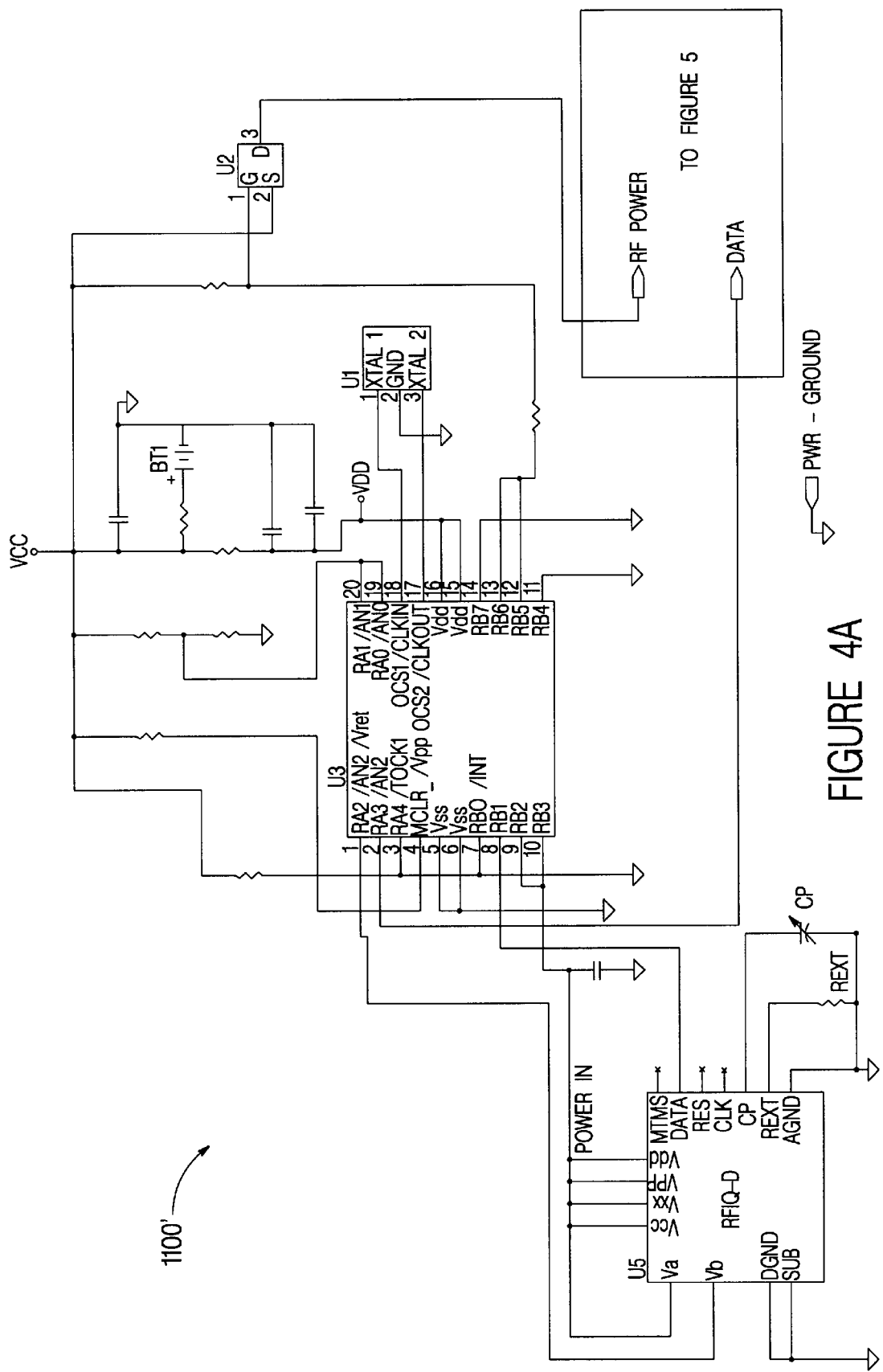
Figure 5:
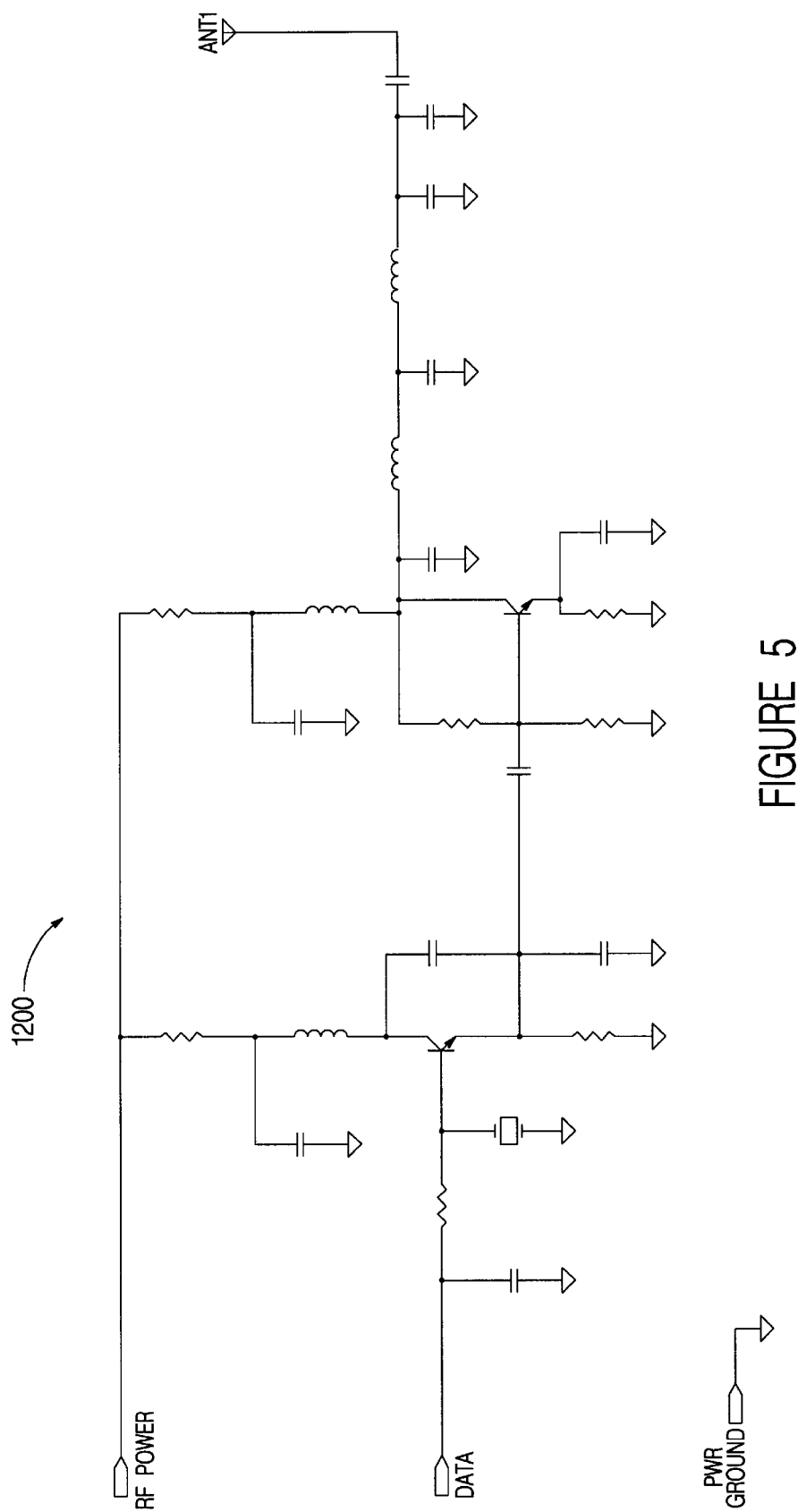
Figure 6:
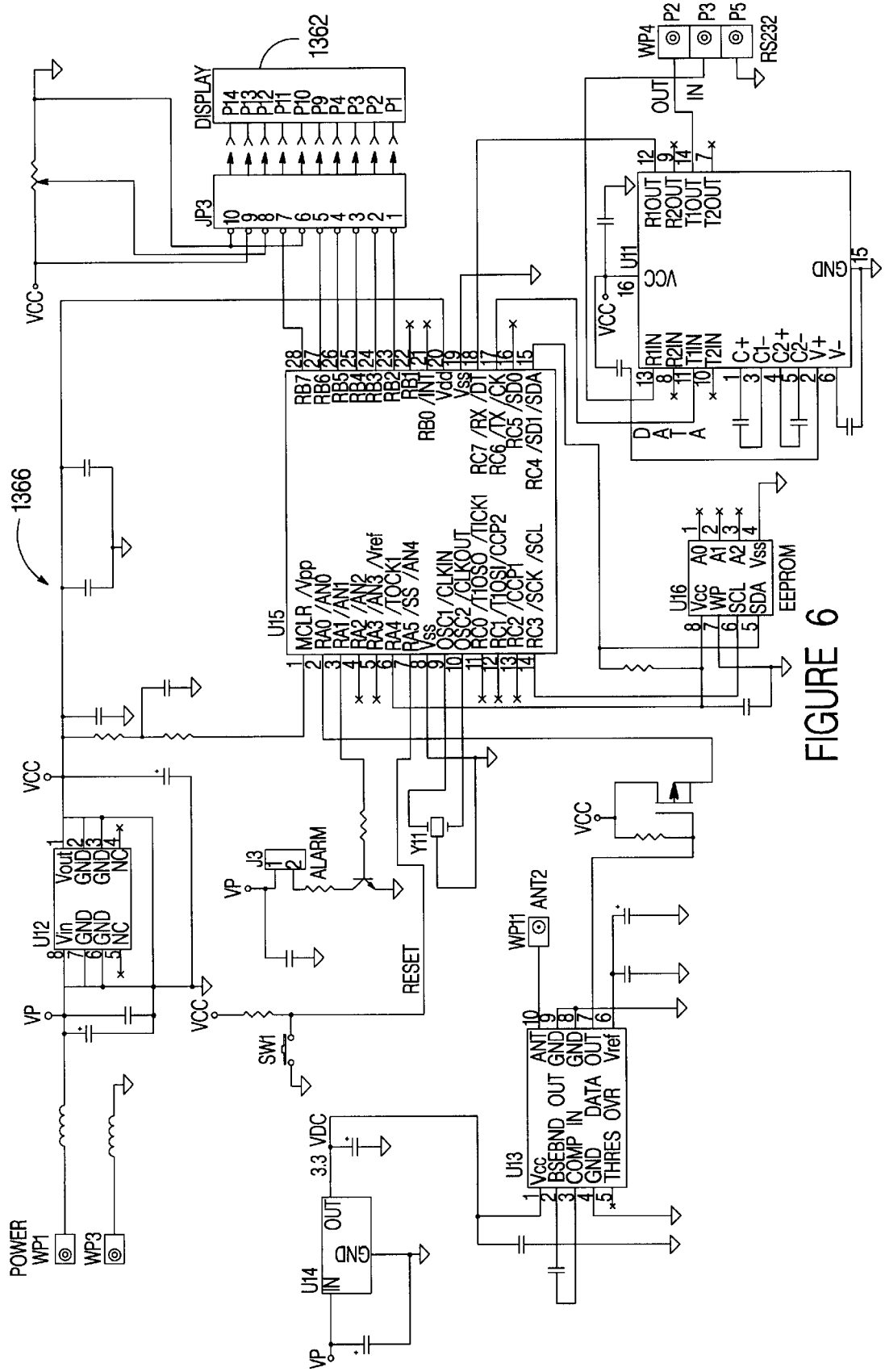
Figure 7:
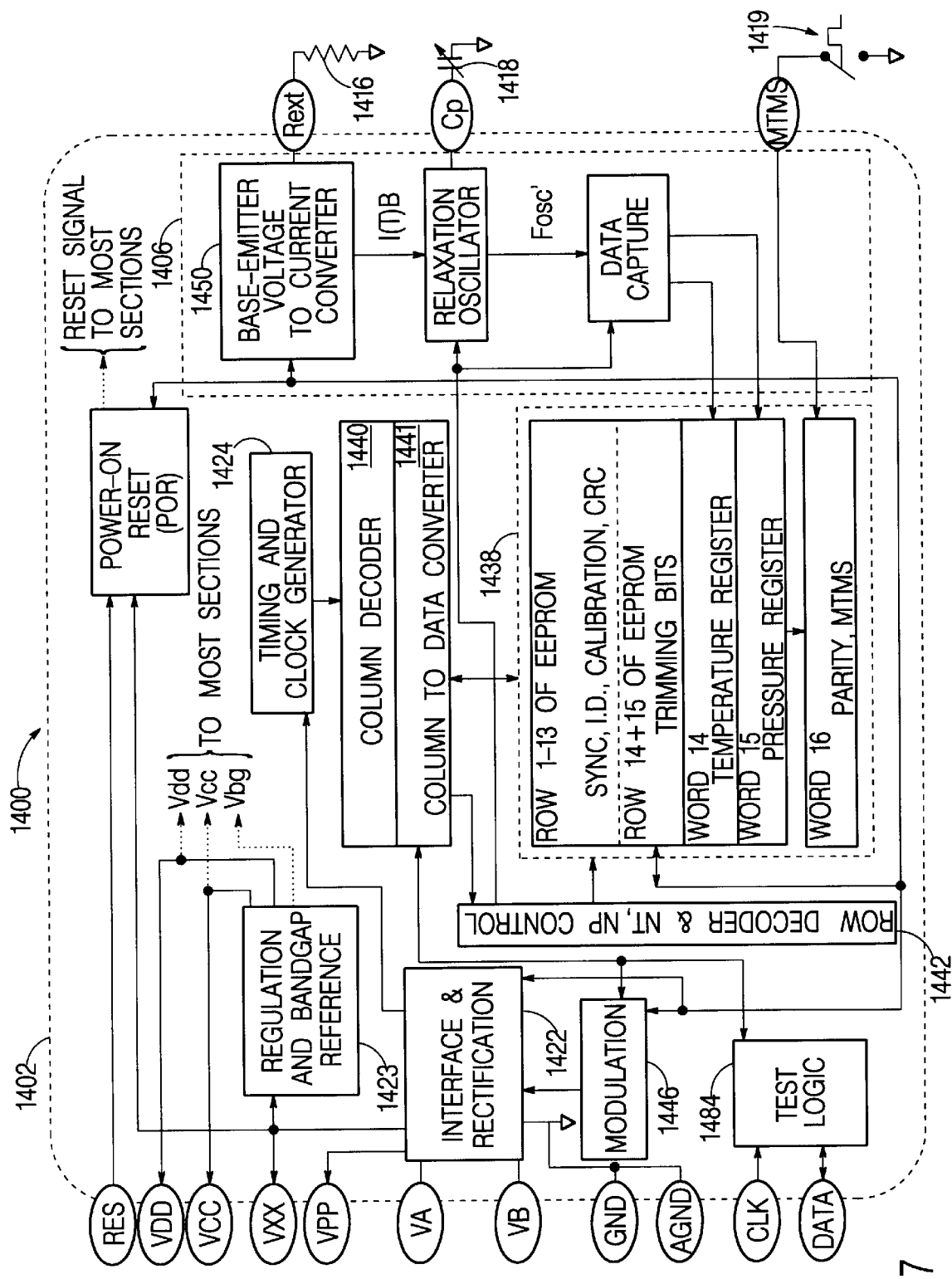
Figure 8A:
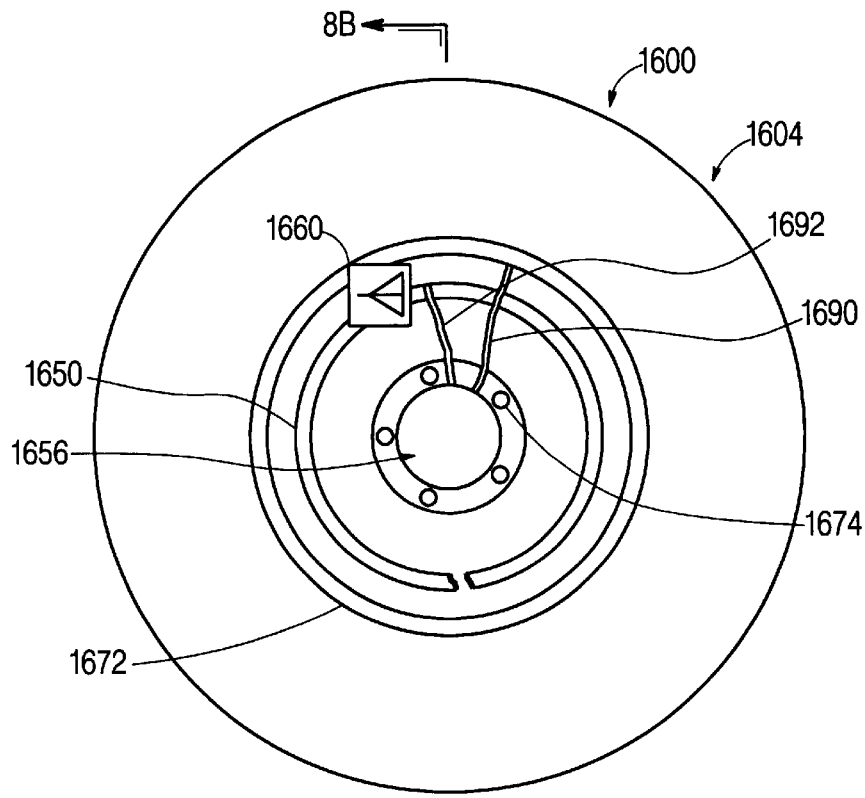
Figure 8B:
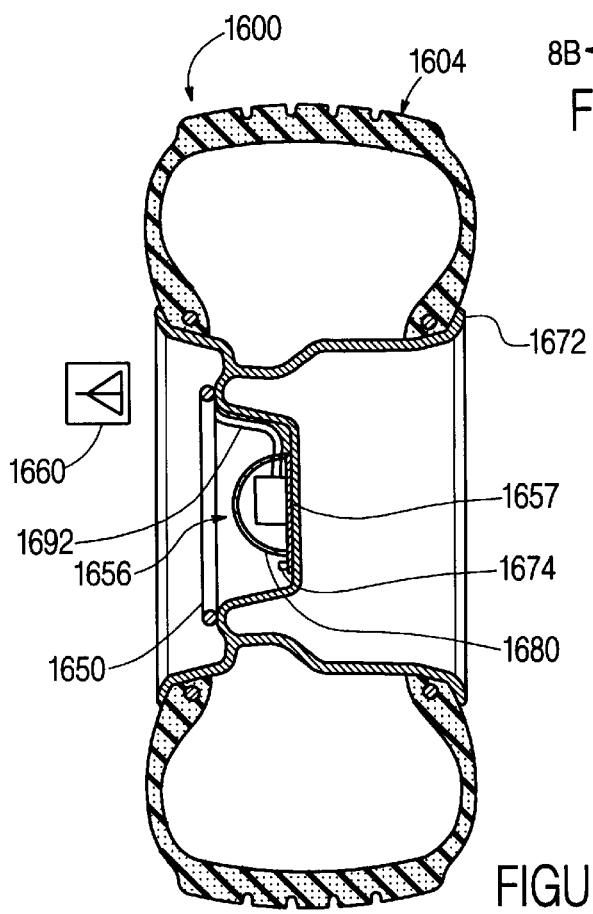

The structure, operation, and advantages of the present preferred embodiment of the invention will become further apparent upon consideration of the following description taken in conjunction with the accompanying drawings, wherein:

FIG. 1 is a simplified block diagram of a tire pressure monitoring system, according to the prior art;

FIG. 1A is a simplified block diagram of a tire monitoring and regulating system having features according to the invention;

FIG. 1B is a cross-sectional view of a wheel-mounted portion of the tire monitoring and regulating system of FIG. 1A;

FIG. 1C is a top view of a PC board having a partial loop type antenna, according to the invention;

FIGS. 1D and 1E are a side cross-sectional view and an inside end view, respectively, of an alternative tire monitoring and regulating device having a helical antenna, according to the invention;

FIG. 2 is a simplified block diagram of a passive transponder, according to the prior art;

FIG. 3A is a side plan view, partially sectioned, of a tire having a transponder mounted therein, according to the prior art;

FIG. 3B is a cross-sectional view of the tire of FIG. 3A, taken on a line 3B—3B through FIG. 3A, according to the prior art;

FIG. 3C is a cross-sectional view of the tire of FIG. 3A, rotated 180 degrees, taken on a line 3C—3C through FIG. 3A, according to the prior art;

FIG. 4 is a schematic diagram of the circuitry for a wheel mounted tire condition monitor;

FIG. 4A is a schematic diagram of simplified circuitry for a wheel mounted tire condition monitor;

FIG. 5 is a schematic diagram of the circuitry for a transmitter portion used in conjunction with the tire condition monitors of FIGS. 4 and 4A;

FIG. 6 is a schematic diagram of the circuitry for a tire condition monitoring system receiver;

FIG. 7 is a block diagram of the circuitry for an exemplary tire condition monitoring integrated circuit chip to be used by the tire condition monitor of FIGS. 4 and 4A;

FIG. 8A is a side plan view of a wheel or wheel carrier mounted transmitter and antenna, according to the invention; and FIG. 8B is a cross-sectional view of the tire and wheel of FIG. 8A, taken on a line 8B—8B through FIG. 8A, according to the invention.

DETAILED DESCRIPTION OF THE INVENTION

FIG. 1 illustrates a typical tire pressure monitoring system 100 of the prior art installed on a motor vehicle 102 (shown in dashed lines) having four pneumatic tires 104a–104d (104) installed on four respective wheels (not shown). A transponder ("TAG") 106a, 106b, 106c, 106d (106) is disposed within each of the tires 104, respectively. The transponders 106 are preferably passive transponders which obtain their operating power from an RF signal such as is typically generated by an on-board interrogator 108 which is mounted within the vehicle.

The interrogator 108 comprises an RF transmitter 112 (e.g., for powering passive transponders), an RF receiver 114, control logic 116 which may include a microprocessor ($\mu$P), and a display device 118 such as a visual display and optionally including an audible alarm. Antennas ("ANT") 110a–110d are disposed on the vehicle 102, preferably adjacent the tires 104a–104d, respectively, such as in the wheel wells of the vehicle. The antennas 110 are suitably ferrite loopstick antennas.

The use of multiple vehicle antennas 110a–101d, each at a fixed position on the vehicle adjacent a respective tire 104a–104d is well known and preferred, and is disclosed in U.S. Pat. Nos. 3,553,060; 3,810,090; 4,220,907; 5,541,574; and 5,774,047, all of which are incorporated in their entirety by reference herein.

In use, the interrogator 108 powers the transponders 106a–106d which, in turn, transmit data indicative of a measured condition (e.g., air pressure) back to the interrogator. In any such system, it is desirable to have efficient and effective coupling of signals between the fixed antennas 110a–110d (alternatively, one centrally-located fixed antenna) and the moving (i.e., when the vehicle is in motion) transponders (each of which has its own antenna, not shown).

FIG. 1A illustrates a tire monitoring and regulating system 150 having features according to an embodiment of the invention. The system 150 is installed on a motor vehicle 152 (shown in dashed lines) having four pneumatic tires 104a–104d (104) installed on four respective wheels (not shown) to form four respective tire/wheel assemblies 105a–105d (105). Mounted on the wheel or wheel carrier of each tire/wheel assembly 105 is a tire monitoring and regulating device 156a–156d (156) which includes at least a tire condition monitor 157a–157d (157), which is similar in many respects to the transponder 106 disposed within the tires 104, as illustrated in FIG. 1. Each monitor 157 is preferably an active (e.g., battery powered) circuit capable of measuring the pneumatic (air) pressure (and optionally temperature) of its respective tire 104, of measuring rotation of the wheel or wheel carrier of the assembly 105, and of transmitting RF signals containing data such as pressure by means of an antenna (not shown). Mounted on the vehicle 152, preferably in or close to the vehicle operator's cab, is a receiver 166 which may include a display device 162 such as a visual display and optionally including an audible alarm.

The receiver 166 preferably has a single antenna 160 such as an internal patch type antenna that is etched onto the receiver's electronics PC board or such as an external dipole type antenna. A variation of this preferred embodiment is illustrated in FIG. 1A showing a distributed receiving system wherein the antenna 160 is shown as four antennas 160a–160d (e.g., loopstick antennas), each antenna 160a–160d optionally having an associated subreceiver module 161–a–161d (161), and each antenna 160a–160d being fixedly mounted on the vehicle 152 in close proximity to the transmitters of the wheel or wheel carrier mounted monitors 157a–157d, e.g., mounted on the axle housing close to the wheel hub. It is within the scope of the invention that the sub-receivers 161 communicate with the receiver 166 by various means such as, for example, either by means of individual wires 163a–163d (163) or by means of wireless RF transmission. The wires 163 may also be, for example, a multiplexed serial data bus (e.g., an RS-485 or equivalent vehicle data bus). In the apparatus having a single receiving antenna 160, each of the monitors 157a–157d include a unique identification code (ID), e.g., a 10-bit number, as part of the data contained in the RF signal transmitted by the monitor 157. The receiver 166 is trained to only recognize ID codes from monitors 157 which are mounted on the particular vehicle 152, and to associate each recognized ID code with the appropriate tire/wheel position on the vehicle 152. In the system having antennas 160a–160d, a simpler monitor 157 can be employed which does not utilize an ID code, since the tire/wheel position on the vehicle 152 is simply determined according to which antenna 160a–160d is receiving the signal. It can be seen that this multi-antenna arrangement also simplifies any tire rotation or replacement procedure.

The motor vehicle 152 of the system 150 has been described as a four-wheeled vehicle, such as an automobile. It should be understood that the scope of the invention includes other embodiments with more or less tire/wheel assemblies, for example a truck having 16 or more tire/wheel assemblies, or for example one or more tire/wheel assemblies on the landing gear of an aircraft.

FIG. 1B is a cross-sectional view of a wheel-mounted portion of the tire monitoring and regulating system of FIG. 1A. The tire monitoring and regulating device 156 is mounted on the wheel 172 and both device 156 and wheel 172 are mounted on the axle hub 170 by standard means such as wheel mounting nuts 174. The tire monitoring and regulating device 156 has a protective housing 180 and contains at least the tire condition monitor 157 which is shown as a printed circuit (PC) board 185 with circuit elements attached. In the illustrated system, the housing 180 also contains a tire pressurizing and regulating apparatus 183, such as the apparatus of the Renier/Cycloid '606 Patent described in the background hereinabove. Important features of the apparatus 183 include an air pump 182 for pressurizing a cavity 181 connected by an air pressure connection conduit 190 to the interior of the tire 104 (not shown) which is mounted on the wheel 172; and a pendulum 184 which provides the driving force to the pump 182 (through a cam arrangement not shown) by hanging vertically while the pump 182 and the monitor 157 rotate with the wheel 172 and axle hub 170 to which they are mounted.

The tire condition monitor 157 comprises the PC board 185 (with circuitry to be described hereinbelow) and elements including one or more coils 186 and a transponder circuit chip 188. An antenna wire 192 is shown extending from the PC board 185 for connection to an external antenna mounted on the wheel or wheel carrier (e.g., antenna 1650 illustrated in FIGS. 8A and 8B). Alternative antennas are described hereinbelow with reference to FIGS. 1C and 1D.

Associated with the transponder circuit chip 188 are condition sensors 187 and 189. The sensor 187 is a pressure sensor and is mounted in or communicating with the cavity 181 in order to sense the pressure of the air in the cavity 181 (and thus in the tire 104). The sensor 189 is optionally a temperature sensor such as a thermistor and may be mounted in the cavity 181 as shown, or may be incorporated in the transponder circuit chip 188, or mounted anywhere else such as on the printed circuit board 185 or on the wheel 172. Obviously, the mounting location of the optional temperature sensor 189 will determine how accurately the sensor 189 can determine the actual temperature of the air inside the tire 104.

The one or more coils 186 are utilized to indicate rotation of the wheel 172 using known means such as generating a pulse whenever a coil 186 passes under the pendulum 184 which suitably incorporates a magnet or appropriate metallic content. With a single coil 186 and a pendulum 184 having a single arm passing over the coil 186, it can be seen that only one pulse will be generated per revolution of the wheel 172, and such pulses can be counted and timed to determine quantity of revolutions and average speed of revolution. Means other than coils 186 can be utilized to detect revolution of the wheel 172 (and PC board 185) relative to the pendulum 184, for example, an optical sensor. By employing multiple coils 186, or by adding multiple lobes to the pendulum (e.g., a star wheel or toothed wheel) any desired resolution of the angle of revolution may be obtained, as in an angular position encoder.

FIG. 1C illustrates a top view of a PC board 185' which is similar to circuit board 185 except that a partial loop type antenna 191 is etched as a trace to the outside surface of the PC board 185' for use as a self-contained transponder antenna in place of the antenna wire 192 and external antenna 1650 (see FIGS. 8A and 8B described hereinbelow). The PC board 185' may be used with or without the tire pressurizing and regulating apparatus 183 shown in FIG. 1B. When used with the apparatus 183, the pump 182 passes through the center of the PC board 185'. If revolution counting is to be included, an optional one or more coils 186 are included along with the necessary circuitry (see circuit 1100 of FIG. 4 and circuit 1200 of FIG. 5 described hereinbelow) on the PC board 185'. A pendulum (e.g., 184 in FIG. 1B) which interacts with the one or more coils 186 generates pulses for the revolution counting as described hereinabove. A pendulum similar to pendulum 184 can be provided even if the pump 182 is not present. If revolution counting is not to be included, then the PC board 185' may be simplified by the elimination of the one or more coils 186 and the associated revolution counting circuitry (simplified circuit 1100' of FIG. 4A combined with circuit 1200 of FIG. as described hereinbelow).

Regardless of the optional configuration chosen, the tire condition monitor 157' (which may be equivalent to the tire condition monitor 157) includes the transponder circuit chip 188 along with other associated circuitry as described hereinbelow with reference to FIGS. 11A and 12 (optionally expanded as in FIG. 4).

The partial loop antenna 191 comprises a serpentine portion 191*b* and an end portion 191*a* which is adjacent to a trimming scale 195 imprinted on the top surface of the PC board 185'. The serpentine portion 191*b* provides a way to increase the effective length of the antenna without also extending the angular arc length of the antenna trace around the circumference of the PC board 185'. The end portion 191*a* is not covered by any printed circuit board coating material, so that a portion of the exposed metallic trace material of the antenna 191 may be easily cut and trimmed off. The trimming scale 195 is used to indicate optional locations for trimming the end portion 191*a* of the antenna 191. Such antenna trimming serves multiple purposes. One purpose is to enable tuning of the antenna for optimum transmission at different radio transmission frequencies, as appropriate for operation in different countries (e.g., U.S., Europe as detailed hereinbelow with reference to the receiver 1300 of FIG. 6). A second purpose for the antenna trimming is to fine tune transmissions, especially when the transmissions have to accommodate interactions with a interfering objects such as the pendulum 184 and/or one or more coils 186. The fine tuning may take place as an experimental procedure in the development of the tire monitoring and regulating device 156 design, or it may be a part of factory adjustments made during the final stages of manufacturing and assembly of each device 156. It can be seen that the trimming scale 195 will be useful as a guide to proper antenna trimming in all such purposes.

It should be noted that the partial loop antenna 191 extends only part way around the circumference of the PC board 185', and that it avoids the proximity of the optional one or more coils 186. This placement of antenna 191 and coil 186 is for avoiding interference by the coil 186 with RF signals transmitted by means of the antenna 191. Also, it can be seen that a pendulum (e.g., 184), if present, may possibly interfere with the RF signal transmissions whenever it is hanging adjacent to a portion of the antenna 191. The partial loop design of antenna 191 advantageously provides a significant fraction of the circumference where such interference will not take place, thereby providing a transmission window of time during each revolution of the wheel 170 and wheel-mounted PC board 185'. As detailed hereinbelow, the present invention minimizes the total packet length of a transmitted message in order to make optimum use of such a transmission window.

FIGS. 1D and 1E illustrate, in side cross-sectional view and inside end view, respectively, an alternative tire monitoring and regulating device 156' having a helical antenna 193 preferably contained within a protective housing 180' which is substantially cylindrical in shape. The embodiment illustrated has a PC board 185" without any pump, pendulum, or coils. The tire condition monitor 157" circuitry (e.g., circuits 1100' and 1200) on the PC board 185" comprises a transponder 188 with the associated pressure sensor 187 and optional temperature sensor 189. The condition sensors 187, 189 are shown mounted within a cavity 181' which is connected by an air pressure connection conduit 190' to the interior of the tire 104 (not shown) which is mounted on the wheel 172. The tire monitoring and regulating device 156' is mounted on the wheel 172, and both device 156' and wheel 172 are mounted on the axle hub 170 by standard means such as wheel mounting nuts 174.

The antenna 193 associated with the transponder 188 has a horizontal portion 193*a* which extends outwardly from the PC board 185" to a suitable distance away from the PC board 185", for example, out to the inside surface of the protective housing 180'. The antenna 193 is then spiraled in a vertical plane to form a helical portion 193*b*, as best seen in FIG. 1E. The antenna 193 generally conforms to the shape of the interior surfaces of the protective housing 180', and is preferably supported by the protective housing 180'. For example, the antenna 193 can be attached to or formed into the protective housing 180' with a suitable detachable electrical connection between the antenna horizontal portion 193a and the circuitry 157" on the PC board 185". The protective housing 180' is preferably made of a nonconductive material such as, for example, a thermoplastic material. FIG. 2 illustrates, generally, an exemplary prior art passive RF transponder 200 (compare 106, 188). An antenna 202, such as a coil antenna, receives a carrier signal from the interrogator 108 (via antennas 110a–110d). The carrier signal, of frequency F, is rectified by a rectifier circuit 204 connected to the transponder's antenna 202 in order to generate operating power for active circuitry in the transponder—in this example, for clock and control logic circuitry 206 and for sensor interface and data generation circuitry 208. Data derived from one or more condition sensor(s) 210, such as a temperature sensor and a pressure sensor, is optionally stored in memory 212, and is encoded (e.g., digitized) and mixed with the carrier signal in a modulator circuit 214. The output of the modulator circuit 214 is transmitted via the antenna 202 back to the interrogator 108 (compare receivers 161, 166). It is well understood that the clock and control logic circuitry 206 can derive a clock signal in a straightforward manner from the RF carrier signal transmitted by the interrogator 108. For example, the carrier signal illuminating (powering) the transponder may be at 125 kHz and may be passed through a "divide-by-10" divider circuit (not shown) to generate clock pulses at 12.5 kHz. It is also well understood that clock signals can be counted by a counter (not shown), and that an accumulated count in a counter can be digitized and transmitted by a transponder.

FIG. 7 illustrates the general circuitry of an exemplary transponder circuit chip 1400 (compare 106, 188, 200) which is particularly suited for use as the transponder 188 which is incorporated in the monitor apparatus 157 illustrated in FIGS. 1A and 1B. The transponder 1400 is the Goodyear/Phase IV "RFIQ-D" custom ASIC which is described in detail in the co-pending PCT Patent Application PCT/US99/18610 incorporated in its entirety by reference herein, and having a common assignee with the present application. Contained on the IC chip 1402, are interface 1422 and modulation 1446 sections (compare 214) and connection pads VA and VB for an external antenna (compare 202, 192). Rectification 1422 and regulation 1423 sections (compare 204) provide operating power, and a timing/clock section 1424 works with column decoder 1440, column to data converter 1441, and row decoder/control 1442 sections to provide control logic (compare 206). Data derived from external condition sensors (compare 210) for temperature 416 (compare 189), pressure 418 (compare 187), and excessive temperature 1419, is processed in a sensor interface/data generation section 1406 (compare 208), stored in memory 1438 (compare 212), and encoded for transmission by the modulation section 1446 (compare 214). A test logic section 1484 can be used for a direct output of data via the DATA terminal instead of RF-transmission in cases where the transponder 1400 is used as part of a larger circuit such as the monitor 157 circuitry which will be described hereinbelow. It should be noted that the primary means of sensing temperature is the base-emitter voltage to current converter 1450 which is integrated in the IC chip 1402 and utilizes an external precision resistor Rext, however the external "temperature sensor" 1416 can also be temperature sensitive, utilizing a thermistor, for example, in place of or in combination with the precision resistor Rext. The external pressure sensor 1418 is suitably a capacitive pressure sensor, for example a Delco TCAP4 or a Fujikura FCAP4.

FIG. 4 (circuit portion 1100) and FIG. 5 (circuit portion 1200) illustrate monitor 157 circuitry as implemented on the printed circuit board 185. In this implementation, there is a single coil L3 (compare 186) that is used for counting revolutions of the PCB 185 relative to the pendulum 184. The circuit 1100 employs two microcontrollers U3, U4, and the RFIQ-D transponder U5 (compare 1400, 188) to control the gathering of input data from the sensors CP (1418) and REXT (1416) and the coil L3 (186). Output data is sent to the RF circuit portion 1200 for RF transmission by means of an antenna ANT1 (compare 192). The monitor 157 employs a battery BT1 (suitably a Lithium Thional Chloride battery such as an Eagle Picher LTC-3PN battery, 350 mA-Hr, 3.6V nominal) for power supplies VCC and VDD to the circuitry 1100, and is interfaced by circuit element U2 (suitably an NDS0610CT chip) to provide the RF POWER to the RF circuitry 1200. The use of such a battery BT1 allows the transponder chip U5 to be used in active mode, instead of relying on RF transmissions to generate power internally, so the transponder chip U5 is connected appropriately with power being supplied by the microcontroller U3 to all voltage terminals Va, VCC, VXX, VPP, and VDD.

In operation during vehicle motion (as detected by the coil L3), the clocking microcontroller U4 (e.g., a Microchip PIC 12CLC509A running at 32 kHz in conjunction with an oscillator Y1) runs continuously, and periodically wakes the monitoring microcontroller U3 (e.g., a Microchip PIC 16LC622A running at 4 MHz in conjunction with an oscillator U1). The clocking microcontroller U4 monitors the coil L3, accumulates and stores a revolution count, and provides the basic system timing including a clock signal output on the GP0 pin 7 to the monitoring microcontroller U3 (pin 1) and to the transponder U5 (VB terminal). When the monitoring microcontroller U3 is wakened by an interrupt at pin 7 "RB0/INT", it turns on power at pins 9 and 10, "RB2" and "RB3" to activate the transponder U5 for sensor readings. The data from the transponder U5 (including pressure, temperature, and an ID code) is output as a serial data string on the DATA terminal of the transponder U5 and received at the pin 8 "RB1" terminal of the monitoring microcontroller U3. The monitoring microcontroller U3 combines the sensor data from the transponder U5 and the revolution count from the clocking microcontroller U4 to form a transmission data string which is output on the pin 2 "RA3/AN2" terminal to the DATA line of the RF circuitry 1200. The 4B5 encoding prevents long runs of either ones or zeros in the data stream.

The transmission data string is, for example, formed into message packets in the 4B/5B format using straight NRZI for bit determination. Each packet begins with a 10 bit sync pattern which is not further encoded. The sync pattern is 1101001010. Following the sync pattern is a 10 bit ID number, the last two bits of which determine wheel or wheel carrier position. Next are 6 bits of pressure data (0–63 PSI gauge), 8 bits of temperature data (degrees C preceded by a sign), and a 16 bit accumulated revolution count. At the end of the packet is an 8 bit CRC. This gives a total of 48 bits (excluding the sync bits) that are encoded into 60 bits by the 4B/5B coding scheme. The total packet length, including sync, is 70 bits so that a packet can be transmitted in 19.44 msec at a rate of 3600 bits per second (BPS). This transmission speed helps allow transmission of a complete packet in between those times when the pendulum 184 may be interfering with, or blocking transmission from, an antenna such as the partial loop antenna 191 formed on the PC board 185'. For example, a wheel 172 which is rotating at 1000 RPM (a high speed for a vehicle tire/wheel assembly) makes a complete revolution of 360 degrees every 60 msec. A message packet transmitted in 19.44 msec can be transmitted during a transmission window of at least 116.64 degrees when the wheel 172 is rotating at 1000 RPM.

FIG. 5 illustrates an embodiment of the RF transmitter circuitry 1200. The circuit 1200 employs standard RF circuit design elements with component values suitable to achieve the desired RF transmission characteristics for transmitting the transmission data packet which is on the DATA line as supplied by the circuitry 1100 of FIG. 4. The RF transmitter, for example, operates at 315 MHz or 418 MHz in the U.S. and Canada, 433.92 MHz in Europe, and 303.825 MHz in Japan; with an RF power output of approximately 0 dBM at the antenna port (except considerably less in Japan), employing a SAW (Surface Acoustic Wave) resonator as the basic RF frequency generating element. The transmitters are certifiable in the U.S. under FCC part 15.231 to be used as unlicensed transmitters and under similar provisions in other countries. Frequency stability is +/−75 kHz at 25 degrees C, with a temperature coefficient no greater than 0.032 ppm/degree C.

FIG. 6 illustrates an embodiment of the receiver 1366 (compare 166) as it would be configured for a single-antenna system (e.g., FIG. 1A system 150 with a single, centrally-located antenna 160 and no optional sub-receiver 161). The receiver 1366 is controlled by a microcontroller U15 (e.g., a Microchip PIC16C73B running at 4 MHz in conjunction with a ceramic resonator Y11) which receives a serial data string message packet by means of an antenna ANT2 (compare 160), decodes the packet data, accumulates a total revolution count for each tire/wheel assembly 104 and stores these counts in an EEPROM memory chip U16, calculates a temperature-corrected pressure from the packet data, and outputs suitable information to a display 1362 (compare 162, for example, a 2-line by 16 character LCD display), to a connector WP4 for an RS-232 serial line (for connection to an optional external PC computer, for example), and to a connector J3 for an alarm (e.g., a beeper which may be incorporated into the display 162). The microcontroller U15 also receives input from a momentary action pushbutton SW1, and resets all revolution counts to zero whenever the pushbutton SW1 switch is closed. The RS-232 serial connection WP4 is a two-way link allowing communication from an external PC in to the microcontroller U15 (e.g., for programming the microcontroller U15), as well as communication out (e.g., to output raw data decoded from the packet data).

The receiver 1366 is powered by connection through power connectors WP1, WP3 to the electrical system of the vehicle 152, at a nominal DC voltage level VP (typically 12 VDC). A DC voltage converter U12 converts VP to the VCC voltage level (e.g., 5 VDC) for use by most of the circuitry, except where noted. An RF demodulator U13 interfaces the antenna ANT2 to the microcontroller U15. The exemplary RF demodulator U13 requires a separate 3.3 VDC power supply which is provided by a DC voltage converter U14.

The pin numbers P1–P14 for the display 1362 are shown as they should be connected to the pins 1–10 of the connector JP3. The RS-232 line (connector WP4) is interfaced to the microcontroller U15 by a serial port chip U11, with the microcontroller U15 transmitting TX line (pin 17) sending data out to the serial port chip U11 transmit-in T1in (pin 11) which then converts the data according to the RS-232 voltage levels and transmits it out the T1 out (pin 14) to pin 2 (P2) of connector WP4. Incoming serial communications are received on pin 3 (P3) of connector WP4 leading to the serial port chip U11 receive-in R1 in (pin 13) which then converts the RS-232 protocol data to a serial data string which is emitted from the U11 receive-out R1 out (pin 12) and sent to the microcontroller U15 receiving RX line (pin 18).

If revolution counting is not to be included in the condition monitoring, then a simplified circuit 1100' illustrated in FIG. 4A may be used in place of the circuit 1100. It can be seen that circuit 1100' is essentially the same as circuit 1100 but with the revolution detecting and counting circuitry removed. Thus, circuit 1100' has retained the battery BT1, the transponder U5, the microcontroller U3, and associated circuitry; but the coil L3, the microcontroller U4, and their associated circuitry have been eliminated from circuit 1100'. Pin 7 of the microcontroller U3, which was previously connected to microcontroller U4 is now suitably grounded. The specific components and values stated hereinabove for the circuitry of FIGS. 4, 4A, 5, and 6 are exemplary for incorporation within a preferred embodiment of the invention. No doubt, the skilled person will be able to utilize these teachings and make variations of these specifics that also accomplish the objectives of this invention, but such variations are considered to be within the scope of this invention.

An example of normal receiver 1366, 166 operation is as follows. Each time the receiver decodes a valid message it will beep and display information relating to the specific wheel or wheel carrier position identified in the message ID. The displayed pressure is in PSIG units (pounds per square inch gauge); temperature is displayed as plus or minus degrees C; and wheel or wheel carrier revolutions will accumulate and be displayed to a total of 10 million at which point the total will roll over and start again from zero. The first line of the display will show wheel or wheel carrier position, pressure, and temperature. The second line shows total revolutions (rotations "ROT"). For example:

LF_P:35_T:+65C
ROT:08,555,444_

FIGS. 3A, 3B and 3C illustrate an RF transponder system 300 of the prior art comprising a passive transponder 302 (compare any of 106a–106d, 200) disposed within a pneumatic tire 304 (compare any of 104a–104d). In this example, the transponder 302 is a passive transponder, and is mounted in any suitable manner to an inner surface 306 of the tire 304. An antenna 320 (compare any of 110a–100d) is disposed on the vehicle near the tire 304 such as in a wheel well, to provide electromagnetic radiation to power the transponder 302 (in the case of a passive transponder), as well as to receive signals from the transponder 302.

As illustrated in FIGS. 3A, 3B and 3C, the vehicle antenna 320 is fixedly disposed (positioned) at the "12 O'clock" orientation with respect to the tire 304, such as abreast of a top portion of the tire. It should be understood that the antenna 320 may be disposed at any position suitable for coupling electromagnetically with the transponder 302 without interfering with movement (e.g., rotation, steering, rebounding) of the tire 304.

As the tire 304 rotates (as indicated by the arrow 330), the transponder 302 will be alternately nearer to and farther from the antenna 320. As illustrated in FIGS. 3A and 3B, the tire 304 is oriented so that the transponder 302 is at the "6 O'clock" position with respect to the antenna 320. This being the furthest the transponder 302 can be from the antenna 320, the coupling of an RF signal between the antenna 320 and the transponder 302 will be relatively weak as compared with the coupling between the antenna 320 and the transponder 302 when the tire has rotated 180 degrees and the transponder 302 is in the "12 O'clock" position, as illustrated in FIG. 3C. Thus, it is evident that, as the tire 304 rotates, there will be cyclical fluctuations in the RF energy coupling between the antenna 320 and the transponder 302.

Thus it can be seen that by placing the transponder antenna on the wheel (e.g., as shown for antenna 1650 in FIGS. 8A and 8B), or by placing the transponder antenna close to the axis of wheel rotation (e.g., as shown for antennas 191 and 193) an advantage results in terms of more uniform coupling to a receiver antenna 160 due to essentially constant distance between the transmitting and receiving antennas regardless of wheel rotation.

FIGS. 8A and 8B illustrate, in side and in cross-sectional views, respectively, a preferred embodiment 1600 of the tire/wheel or wheel carrier assembly 105 portion of the condition monitoring system 150 of FIG. 1A, wherein a tire 1604 (compare 104) is mounted on a wheel or wheel carrier 1672 (compare 172).

A wheel or wheel carrier transponder 1657 (compare 157) is, for example, a transponder (e.g., 1400) mounted on the wheel or wheel carrier 1672 (compare 172), is preferably in a protective housing 1680 (compare 180) which is held in place by wheel mounting nuts 1674 (compare 174). Optionally, the wheel or wheel carrier transponder 1657 may be incorporated (e.g., 188) in a tire monitoring and regulating device 1656 (compare 156) having an air pressure connection conduit 1690 (compare 190) extending from the device 1656 to the tire 1604.

For the antenna associated with the wheel or wheel carrier transponder 1657, this embodiment of a transponder system 1600 incorporates a circular dipole antenna 1650 which is shown attached to the wheel or wheel carrier 1672 in a convenient location. Although shown as mounted on the axially outward side of the wheel 1672, it should be understood that the antenna 1650 could be mounted anywhere on the wheel 1672, including on the axially inward side of the wheel 1672. An antenna wire 1692 (compare 192) connects the wheel or wheel carrier antenna 1650 to the wheel or wheel carrier transponder 1657. Alternative embodiments include, for example, a partial loop antenna 191 etched as a trace on the circuit board 185' associated with the wheel or wheel carrier transponder 188 (see FIG. 1C); or, for example, a helical antenna 193 extending away from the PC board 185" but contained within the protective housing 180' (compare 1680) (see FIG. 1D); or, for example, terminating the antenna wire 1692 in a small coupling coil adjacent to the antenna 1650 which is formed as an endless hoop type of antenna.

A receiving antenna 1660 (compare 160) is shown mounted on the vehicle (not shown) in close proximity to the antenna 1650. As mentioned hereinabove, the receiving antennas 160, 1660 can be mounted anywhere on the vehicle, and preferably comprise a single receiving antenna 160 which is centrally located on the vehicle, e.g., with a single receiver 166.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A system for monitoring pneumatic tire conditions for one or more tire/wheel assemblies mounted on a vehicle;

each tire/wheel assembly comprising a tire mounted on a wheel or wheel carrier; and the system comprising:

a transponder with a transmitting antenna mounted on the wheel or wheel carrier of the one or more tire/wheel assemblies for transmitting a signal indicating the condition of the tire of the one or more tire/wheel assemblies, one or more receivers each having one or more receiving antennas fixedly mounted on the vehicle, and circuitry for processing the signals received by the one or more receiving antennas to determine the condition of the tire of the one or more tire/wheel assemblies;

the system characterized in that:

circuitry for each transponder is disposed on a printed circuit board within a protective housing coaxial to the hub of the wheel or wheel carrier; and each transmitting antenna is selected from the group consisting of a partial loop antenna, a helical antenna, a circular dipole antenna, and a small coupling coil adjacent to an endless hoop antenna.

2. A system, according to claim 1, characterized in that:

the transmitting antenna is a partial loop antenna;

the partial loop antenna is affixed on a surface of the printed circuit board around a portion of the circumference of the printed circuit board, and has an angular arc length; and the partial loop antenna comprises a serpentine portion for increasing the effective length of the partial loop antenna without also extending the angular arc length.

3. A system, according to claim 2, characterized in that:

the transponder comprises one or more RF transmission-interfering objects; and the angular arc length and the affixed placement of the partial loop antenna are determined for avoiding interference.

4. A system, according to claim 2, characterized in that:

the partial loop antenna comprises an end portion adjacent to a trimming scale imprinted on the printed circuit board, for indicating locations for trimming the end portion as a guide to proper antenna trimming.

5. A system, according to claim 2, characterized by:

means for trimming the partial loop antenna end portion to enable tuning of the antenna for optimum transmission at different radio transmission frequencies.

6. A system, according to claim 1, characterized in that: the system comprises a pump system mounted on the wheel or wheel carrier of the one or more tire/wheel assemblies for tire pressure regulation; and a tire pressure sensor connected to the wheel or wheel carrier transponder for measuring the tire pressure.

7. A system, according to claim 1, characterized in that:

the transmitted signal comprises a message packet short enough to transmit within less than one revolution period of the wheel or wheel carrier when the vehicle is moving at its fastest expected speed.

8. A system, according to claim 7, characterized in that:

the message packet begins with a 10 bit sync pattern which is not further encoded; and the remainder of the message packet comprises data bits ending with an 8 bit CRC, wherein the remainder is encoded by a 4B/5B coding scheme using straight NRZI for bit determination.

9. A system for monitoring automatic tire pressure maintenance for one or more tires of a vehicle, wherein a pump system in a housing attached to each of one or more wheels or wheel carriers of the vehicle is utilized to automatically maintain a setpoint pressure in a pneumatic tire mounted on the wheel or wheel carrier, the system characterized by:

a transponder mounted in the housing with the pump system, wherein circuitry for the transponder is on a printed circuit board within the housing and coaxial to the hub of the wheel or wheel carrier;

a transmitting antenna associated with the transponder;

a receiver mounted on the vehicle;

a receiving antenna associated with the receiver;

a tire pressure sensor connected to the transponder; and a control circuit associated with the transponder for measuring the tire pressure using the tire pressure sensor, for converting the tire pressure measurement to an RF signal, and for transmitting the RF signal to the receiving antenna and receiver using the transmitting antenna.

10. A system, according to claim 9, characterized in that: the transmitting antenna is selected from the group consisting of a partial loop antenna, a helical antenna, a circular dipole antenna, and a small coupling coil adjacent to an endless hoop antenna.

11. A system, according to claim 10, characterized in that: the transmitting antenna is a partial loop antenna;

the partial loop antenna is affixed on a surface of the printed circuit board around a portion of the circumference of the printed circuit board, and has an angular arc length; and the partial loop antenna comprises a serpentine portion for increasing the effective length of the partial loop antenna without also extending the angular arc length.

12. A system, according to claim 11, characterized in that: the system comprises one or more RF transmission-interfering objects contained in the housing; and the angular arc length and the affixed placement of the partial loop antenna are determined for avoiding interference.

13. A system, according to claim 11, characterized in that: the transmitted signal comprises a message packet short enough to transmit within less than one revolution period of the wheel or wheel carrier when the vehicle is moving at its fastest expected speed.

14. A system, according to claim 13, characterized in that: the message packet begins with a 10 bit sync pattern which is not further encoded; and the remainder of the message packet comprises data bits ending with an 8 bit CRC, wherein the remainder is encoded by a 4B/5B coding scheme using straight NRZI for bit determination.

15. A system, according to claim 9, characterized in that:

the pump system comprises a pendulum;

the transponder circuitry comprises one or more coils for interacting with the pendulum to determine a revolution angular position or a revolution count; and the control circuit includes the revolution count in the transmitted RF signal.

16. A system, according to claim 9, characterized in that:

a temperature sensor is connected to the transponder for measuring temperature; and the control circuit transmits an RF signal which includes the measured temperature.

17. A system, according to claim 9, characterized in that:

the receiver is a single unit; and a display is associated with the receiver for informing a vehicle operator about tire pressure maintenance for each of the one or more tires.

18. A system, according to claim 17, characterized in that:

the receiving antenna is a single antenna; and the control circuit associated with the transponder on each of the one or more wheels or wheel carriers of the vehicle includes a unique transponder identifying code in the transponder's RF signal.

19. A pneumatic tire condition monitor in combination with a tire pressurizing and regulating apparatus for one or more tires of a vehicle, wherein the apparatus is in a housing attached to each of one or more wheels or wheel carriers of the vehicle, the monitor characterized by:

a partial loop antenna mounted in each housing with the apparatus, affixed on a printed circuit board which is coaxial to the hub of the wheel or wheel carrier;

the partial loop antenna is affixed around a portion of the circumference of the printed circuit board, having an angular arc length;

the partial loop antenna comprises a serpentine portion for increasing the effective length of the partial loop antenna without also extending the angular arc length; and the angular arc length and the affixed placement of the partial loop antenna are determined for avoiding RF signal interference due to interaction with signal-interfering objects in the housing.

20. A pneumatic tire condition monitor according to claim 19, characterized in that:

the partial loop antenna has an end portion which is trimmed for adjusting the effective length to enable tuning of the antenna for optimum transmission at different radio transmission frequencies.

* * * * *